United States Patent [19]
Hamamura et al.

[11] Patent Number: 5,815,748
[45] Date of Patent: Sep. 29, 1998

[54] CAMERA

[75] Inventors: Toshihiro Hamamura, Osaka; Tsutomu Honda; Kiyoshi Seigenji, both of Sakai, all of Japan

[73] Assignee: Minolta Co., Ltd., Osaka, Japan

[21] Appl. No.: 801,072

[22] Filed: Feb. 14, 1997

[30] Foreign Application Priority Data

| | | | |
|---|---|---|---|
| Feb. 15, 1996 | [JP] | Japan | 8-027666 |
| Apr. 8, 1996 | [JP] | Japan | 8-085109 |
| May 9, 1996 | [JP] | Japan | 8-114560 |
| May 9, 1996 | [JP] | Japan | 8-114561 |
| May 9, 1996 | [JP] | Japan | 8-114563 |

[51] Int. Cl.$^6$ .......................... G03B 13/36; G03B 17/48; H04N 7/18
[52] U.S. Cl. .......................... 396/104; 396/125; 396/429; 348/64; 348/345
[58] Field of Search .......................... 396/104, 127, 396/128, 125, 429, 111, 119; 348/64, 349, 345, 353

[56] References Cited

U.S. PATENT DOCUMENTS

| | | | |
|---|---|---|---|
| 4,492,449 | 1/1985 | Oinue et al. | 396/104 |
| 5,634,162 | 5/1997 | Suzuki | 396/429 |

*Primary Examiner*—W. B. Perkey
*Attorney, Agent, or Firm*—McDermott, Will & Emery

[57] ABSTRACT

To shoot a still picture and a moving picture simultaneously, a light beam having passed through a taking lens is split by a half-mirror into two light beams so that one of the split light beams is directed to silver halide film and the other is directed to a CCD. An image captured by the CCD is displayed on a viewfinder. Focus condition of an image on the silver halide film is detected by the phase-difference detection method and focus condition of an image on CCD is detected by the contrast detection method so that, based on detection results, the focus of the taking lens or of a relay optical system is adjusted to obtain a well-focused image. When focus condition detection by one method is impossible, results of focus condition detection by the other method are used to adjust the focus.

22 Claims, 19 Drawing Sheets

CAMERA

BACKGROUND OF THE INVENTION

1. Field of the Invention

The present invention relates to a camera that splits light having passed through its taking lens to shoot pictures by two shooting means, and especially to a method of detecting the focus condition for the purpose of focusing.

2. Description of the Prior Art

Today, cameras are proposed which are capable of shooting both still pictures and video movies, and they achieve this by splitting the light beam incident through the taking lens from an object into two light beams so that one of the split light beams is directed to silver halide film and the other is directed to a photoelectric conversion element such as a charge coupled device (CCD). Such cameras have not only the combined features of a camera for shooting still pictures on silver halide film and of a video camera for shooting video movies, but also additional features that are realized precisely because the same light beam is used for recording both a movie and a still picture.

For example, such a camera allows a still picture to be shot on silver halide film while a movie is being shot. A still picture obtained in this way has precisely the same angle of view as the corresponding scene of a movie, because both the still picture and the scene of the movie result from a light beam that have passed through the same taking lens. Moreover, as is usual with common video cameras, the CCD for shooting movies can be combined with a display device such as a liquid crystal display device (LCD) to constitute a viewfinder.

In such cameras, the CCD, which is originally meant to serve as an image pickup device, usually serves also as a focus detection device. Specifically, the focus of the taking lens is adjusted on the basis of an image captured by the CCD so that a well-focused image of an object is formed on the CCD. Moreover, the CCD can also be used to detect the focus condition of an image formed on silver halide film, since the light beam directed to the silver halide film is identical with that directed to the CCD. For these reasons, cameras so far proposed are not equipped with a separate focus detection device, but use their CCD to detect the focus condition of an image on the silver halide film.

However, to detect precisely the focus condition of an image on the silver halide film by means of the CCD, it is essential that the optical path length from the light-splitting position to the silver halide film be equal to that from the light-splitting position to the CCD. This means that, to allow the same area of an image to be captured on both the CCD and the silver halide film, the image area of the CCD needs to be as large as that of one frame on the silver halide film. However, it is not preferable to use a CCD having such a large image area, because it is extremely expensive, and it inevitably increases the size of a camera.

In some cameras, the optical path length from the light-splitting position to the CCD is set to be longer than that from the light-splitting position to the silver halide film so that the light beam directed to the CCD reach it with a smaller cross-sectional area. In this type of camera, a smaller CCD can be used, but the CCD then receives a reduced image as compared with the image formed on the silver halide film. As a result, the CCD tolerates a greater depth of field, and thus it detects the focus condition with less precision. To take advantage of high definition that characterizes silver halide film pictures, it is essential to detect the focus condition precisely. However, the CCD here cannot detect the focus condition precisely enough to achieve high definition as expected in silver halide film pictures.

Moreover, in the above described construction, where the CCD, an image pickup device, is used to detect the focus condition of both an image on the silver halide film and an image on the CCD, only one detection method can be used. This is disadvantageous because, under certain shooting conditions where that specific detection method does not function properly, it may happen that neither the image on the silver halide film nor the image on the CCD can be brought into focus.

SUMMARY OF THE INVENTION

An object of the present invention is to provide a camera having two shooting sections in which each shooting section detects the focus condition by a detection method suitable for that shooting section and thus detection of the focus condition is less restricted by shooting conditions.

To achieve the above object, according to the present invention, a camera that receives a light beam from an object through a main optical system to shoot an image formed by the light beam is provided with first and second shooting devices for shooting an image formed by a light beam having passed through the main optical system, and first and second detectors for detecting a focus condition of an image in the first and second shooting devices, respectively. The camera is further provided with a light beam splitting element for splitting a light beam having passed through the main optical system into two light beams so that the two split light beams are respectively directed to the first and second detectors.

The shooting devices shoot still pictures and moving pictures. The detectors use as their detecting methods the phase-difference detection method and the contrast detection method. When the focus condition of an image in the first shooting device cannot be detected by the first detector, the focus condition of that image is detected based on a result of detection by the second detector. The first and second detectors detect the focus condition of images formed by light beams coming from the same area, or alternatively one of them detects the focus condition of an image formed by a light beam coming from a narrower area and the other detects the focus condition of an image formed by a light beam coming from a wider area.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
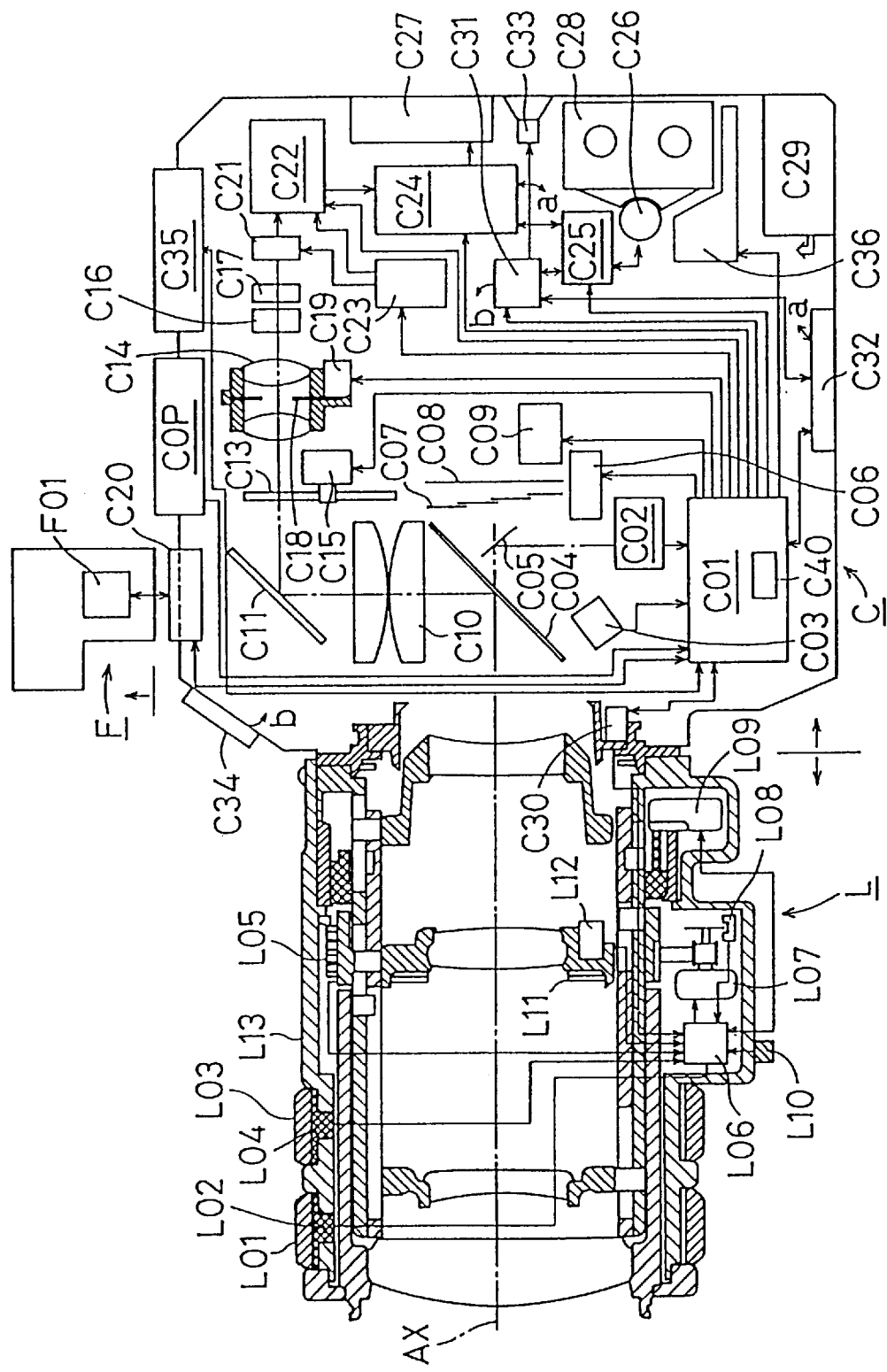
FIG. 1 is a diagram showing the construction of a camera embodying the present invention.

FIG. 1 shows the construction of a camera embodying the present invention. This camera has a camera body C and a taking lens L that are constructed as separate units, so that various interchangeable lenses can be mounted on the camera body C. For example, in FIG. 1, a zoom lens is mounted as the taking lens L on the camera body C.

In this camera, a light beam incident through the taking lens L is split into two light beams so that one of the split light beams is directed to silver halide film to record an image thereon by exposing the silver halide film to the light beam and the other is directed to a charge coupled device (CCD), one of the photoelectric conversion elements, to generate and record an image signal. The camera body C is provided with a display device, and the display device, by displaying images reproduced from the output signal from the CCD and thus with the help of the CCD, serves also as a viewfinder. First, a description will be given below concerning the functions and the outline of operations of the camera, followed by a description concerning the elements constituting the camera.

<Shooting Modes>

The camera operates in one of the following four shooting modes:

PH mode: exclusively for shooting a still picture by means of the silver halide film;

MV mode: exclusively for shooting a moving picture by means of the CCD;

PM mode: for simultaneously shooting both a still picture by means of the silver halide film and a moving picture by means of the CCD;

SV mode: for shooting and recording a still video picture.

Moreover, with respect to shooting performed by means of the silver halide film in PH and PM modes, there are two modes: singe-shot mode in which shooting-is performed frame by frame, and continuous shooting mode in which more than one frames are shot continuously.

<Exposure Control Modes>

Exposure of the silver halide film and the CCD is controlled in one of the following four modes:

A mode: the user-specified aperture value is given priority and the shutter speed is adjusted accordingly;

S mode: the user-specified shutter speed is given priority and the aperture value is adjusted accordingly;

P mode: the aperture value and the shutter speed are adjusted in accordance with a predetermined program line;

M mode: the user-specified aperture value and shutter speed are used.

<Focus Adjustment Modes>

Adjustment of the position at which light is imaged, that is, focus adjustment, in silver halide film shooting and CCD shooting is performed according to the following two modes:

AF mode: focus adjustment is performed automatically;

MF mode: focus adjustment is performed manually.

Moreover, with respect to AF mode established in PH or PM shooting mode, there are two modes: exposure-inclusive AF mode in which focus is adjusted even during exposure of the silver halide film, and exposure-exclusive AF mode in which focus is not adjusted during exposure of the silver halide film.

<Video Reproduction Modes>

An image signal is reproduced in the following mode:

V mode: a moving picture is reproduced from a recorded image signal.

Furthermore, to cope with new-generation silver halide film that has on its surface a magnetic recording medium for recording shooting information, E mode is also available in which recorded shooting information is edited. The focal length of the zoom lens is adjusted by power zooming, in which the zooming lens unit is driven by a motor.

Next, with reference to FIG. 1, the elements constituting the camera will be described below. Note that, throughout the present specification, elements belonging to the camera body C are identified with reference designations beginning with a C, and elements belonging to the taking lens L are identified with reference designations beginning with an L.

The taking lens L has a fixed lens barrel L13, and the fixed lens barrel L13 has on its outer surface operation rings L01 and L03 that are rotatable about the fixed lens barrel L13. These operation rings are operated by the user. Inside the operation ring L01 is an encoder L02 for detecting the rotation of the operation ring L01, and inside the operation ring L03 is an encoder L04 for detecting the rotation of the operation ring L03. The operation ring L01 is operated to adjust the focus of the taking lens L, and the operation ring L03 is operated to adjust its focal length.

L05 represents a focal-length detector for detecting the current focal length of the taking lens L. L07 represents a zoom motor for varying the focal length of the taking lens L, and L08 represents a zoom motor monitor for monitoring the rotation of the zoom motor L07. L09 represents a focus motor for adjusting the focus, L11 represents an aperture diaphragm, L12 represents an aperture controller for adjusting the size of the opening of the aperture diaphragm L11, and L10 represents an AF/MF selecting switch that is operated by the user to toggle the focus adjustment mode between AF and MF modes. L06 represents a controller, realized as a microcomputer, for controlling the focal length, focal point, and aperture of the taking lens (hereinafter also referred to as the lens microcomputer).

With the AF/MF selecting switch L10 set in the MF mode position, when the operation ring L01 for focus adjustment is operated, its rotation is detected by the encoder L02, and detection results are transmitted to the controller L06. The controller L06 processes the received detection results by calculation, and, based on calculation results, drives the focus motor L09 for focus adjustment. When the operation ring L03 for focal-length adjustment is operated, its rotation is detected by the encoder L04, and detection results are transmitted to the controller L06. The controller L06 processes the received detection results by calculation, and, based on calculation results, drives the zoom motor L07 for zoom adjustment. The controller L06 also feeds control signals to the aperture controller L12 to vary the size of the aperture of the opening diaphragm L11 and thus to restrict the light beam passing through the taking lens L. The controller L06 receives information necessary for aperture control from the camera body C.

On the top of the camera body C, a flash and light F can be mounted. The flash and light F is capable of both firing a flash of light and emitting continuous light of a fixed amount to illuminate an object momentarily or for a while. In both cases, the flash and light F is used to compensate for deficiency of light from the object. In most cases, a flash of light is used for silver halide film shooting, and continuous light of a fixed amount is used for CCD shooting. The flash and light F controls its flashing and illumination by a controller F01 incorporated therein.

The camera body C is provided with a controller C01, realized as a microcomputer, for controlling the camera body C (hereinafter also referred to as the main microcomputer). The main microcomputer C01 has, as described later, a non-volatile memory C40 that contains information necessary to bring the image on the silver halide film and the image on the CCD into focus simultaneously. The main microcomputer C01 not only controls the camera body C, but also exchanges information with the lens microcomputer L06 via communication contacts C30 and with the flash and light controller F01 via communication contacts C20 in order to receive information necessary for shooting therefrom and send control instructions thereto.

Specifically, the main microcomputer C01 receives from the lens microcomputer L06 fixed information on the taking lens L itself, such as its open aperture value, and longest and shortest focal lengths, as well as information on the current state, such as the state of the AF/MF selecting switch, focal length, and focal point; the main microcomputer C01 sends to the lens microcomputer L06 information on the state to be set for shooting, such as the aperture value, and focal point. Moreover, the main microcomputer C01 receives from the flash and light controller F01 fixed information on the flash and light F itself, such as its maximum and minimum illumination angle, as well as information necessary to control specific flashing and illuminating operations of the flash and light F, such as whether the flash and light F is ready for operation or not; the main microcomputer C01 sends to the flash and light controller F01 information on the illumination angle to be set for shooting as well as signals for instructing the flash and light to start or stop its operation.

In the camera body C, C04 represents a half-mirror for splitting a light beam having passed through the taking lens L into two light beams to direct the light beam both to a first shooting section that uses the silver halide film and to a second shooting section that uses the CCD. The first shooting section is constituted of a shutter C07, a shutter driver C06, and a film transport mechanism C09 for feeding silver halide film C08.

At the rear of the half-mirror C04 is disposed a movable total-reflection mirror C05 (hereinafter also referred to as the submirror), which reflects downward the light beam having passed through the half-mirror C04. When shooting is performed by the first shooting section, the submirror C05 is retracted by a mechanism (not shown) to a position where it does not intercept the light beam traveling from the half-mirror C04 to the film C08.

Below the submirror C05 is disposed a focus condition detector C02 (hereinafter referred to as the AF module). The AF module C02 is used to detect the focus condition in the first shooting section. How the AF module C02 detects the focus condition will be described in detail later.

C03 represents a photodetector that constitutes a light-measuring and light-adjusting section for detecting the brightness of an object under normal shooting conditions and the brightness of an object illuminated by the flash and light F (hereinafter also referred to as the AE sensor). The AE sensor C03 is disposed in a position where it can detect light reflected from the shutter C07 or film C08. The outputs from the AF module C02 and AE sensor C03 are fed to the main microcomputer C01 so as to be used there for focus control and exposure control, respectively.

In single-shot mode selected in PH or PM mode for silver halide film shooting, when a shutter release button (not shown) is operated, the main microcomputer C01, after adjusting focus in the manner as described later, retracts the submirror C05 and feeds a control signal to the shutter driver C06 to release the shutter C07. When a time corresponding to the set shutter speed has elapsed, the main microcomputer C01 feeds a control signal to the shutter driver C06 to close the shutter C07 and then restores the submirror C05. Meanwhile, the silver halide film C08 is exposed to the light beam having passed through the taking lens L and the half-mirror C04, that is, shooting takes place. After the shutter C07 is closed, the main microcomputer C01 feeds a control signal to the film transport mechanism C09 to feed the silver halide film one frame forward in preparation for a next shot.

In continuous-shooting mode selected in PH or PM mode, after the submirror C05 is retracted, the releasing and closing of the shutter C07 and the feeding of the film C08 are repeated until the shutter release button is released, and then the submirror C05 is restored. Operations in continuous-shooting mode will be described in detail later.

Above the half-mirror C04 are disposed a condenser lens C10 and a total-reflection mirror C11, so that the light beam reflected from the half-mirror C04 is made thinner in diameter converge by the condenser lens C10 and is directed toward the rear side of the camera body by the mirror C11.

C13 represents an ND filter that is designed to vary its light transmittance from full transmittance to several steps of partial transmittance. The light transmittance of the ND filter C13 is controlled by an ND filter controller C15.

C14 represents a relay optical system provided with movable lenses and an aperture diaphragm C18. The first and second shooting sections have different shooting areas, but their angles of view are made nearly identical by the relay optical system C14. The relay optical system C14 is controlled by a relay optical system controller C19, which is composed of a driver section for moving the movable lenses of the relay optical system and for controlling the aperture diaphragm C18 thereof, and a detector section for detecting the current position of the movable lenses and the current size of the aperture diaphragm. The controller C19 adjusts the focus of the relay optical system C14 by moving the movable lenses along the optical axis.

The second shooting section is constituted of an optical low-pass filter C16, an IR (infrared rays) cut filter C17, a CCD C21 serving as an image pickup device, a CCD driver C23 for driving the CCD C21, an imaging processor C22 for sampling an analog signal fed from the CCD C21 to convert them into a digital signal (hereinafter also referred to as the A/D converter), and an image processor C24 for processing an output signal from the A/D converter C22 to convert them into an image signal.

The ND filter C13 and the aperture diaphragm C18 of the relay optical system C14 are provided to cancel the difference in sensitivity of the two image pickup means, that is, the silver halide film and the CCD, and to cancel the increase in the amount of light per unit area directed to the second shooting section due to the provision of the condenser lens C10 and the relay optical system C11 there. Both the ND filter C13 and the aperture diaphragm C18 can reduce the amount of light directed to the second shooting section. When the aperture diaphragm C18 is used to restrict the light beam and thus to reduce its light amount, the second shooting section will have a greater depth of field; by contrast, when the ND filter C13 is used to absorb and thus diminish the light beam, the depth of field of the second shooting section will not be affected. Since, in this way, the ND filter C13 and the aperture diaphragm C18 have different characteristics, they can be used independently or in combination in consideration of their effects on the obtained image.

As the recording medium for recording images formed in the second shooting section, various media can be used; for example, it is possible to use magnetic media such as a magnetic tape or magnetic disk, optical media such as a digital video disk (DVD) or minidisc (MD), or semiconductor-memory media such as a flash memory. In the embodiment under discussion, a magnetic tape C28 is used as the recording medium so that recorded images can be conveniently reproduced for observation on a home-use videocassette recorder.

C26 represents a magnetic head for writing and reading data to and from the magnetic tape C28, C36 represents a magnetic tape drive for driving the magnetic tape C28, and C25 represents a recording/reproducing section for encoding and decoding an image signal. An image signal from the image processor C24 are recorded on the magnetic tape C28 by the recording/reproducing section C25 via the magnetic head C26; an image signal recorded on the magnetic tape C28 are read out by the magnetic head C26 and are reproduced by the recording/reproducing section C25. C27 represents a display (hereinafter also referred to as the EVF) having a color liquid crystal display device (LCD) for displaying images. During shooting by the second shooting section, the display C27 serves as a viewfinder monitor; during reproduction of images recorded on the magnetic tape C28, the display C27 serves as a playback monitor.

C31 represents a sound processor for processing sounds collected by a microphone C34 disposed at the front of the camera body. A sound signal outputted from the sound processor C31 is fed to the recording/reproducing section C25, and is then recorded together with an image signal from the image processor C24 onto the magnetic tape C28. C33 represents a loudspeaker for reproducing sounds while images recorded on the magnetic tape C28 are being reproduced. C29 represents a power supply for supplying electric power to the camera body C, taking lens L, and flash and light F.

COP represents an operation section composed of operation members such as buttons, levers, and switches. By operating the members provided in the operation section COP, the user can, for example, select a shooting mode and an exposure control mode and enter information necessary for shooting in the selected modes, such as the shutter speed necessary for exposure control in S mode. The operation section COP includes the shutter release button, which, when half-pressed (first stroke), outputs a signal S1ON requesting the starting of automatic focus adjustment, and, when fully pressed (second stroke), outputs a signal S2ON requesting the starting of shooting by the first shooting section. C35 represents an indicator having an LCD for indicating the state of the camera. On the indicator C35 is displayed information on the state of the camera, such as the modes currently selected and the level of the power remaining in the power supply.

C32 represents a connector for connecting the camera to an external device. Through the connector C32, the main microcomputer C01, the image processor C24, and the sound processor C31 are connected to the external device. It is thus possible through the connector C32 to control the operation of the camera by feeding control information to the main microcomputer C01 from the external device, and to feed the image and sound signals to the external device. Moreover, the sound processor C31 is capable of recording a sound signal fed from the external device onto the magnetic tape C28 instead of or in addition to a sound signal fed from the microphone C34. The connector C32 is also used to connect the camera to test equipment for after-assembly inspection.

When a main switch provided in the operation section COP is operated to start supply of power, the main microcomputer C01 feeds a control signal to the CCD driver C23 to start the imaging operation of the image pickup device C21. The output signal from the image pickup device C21 is fed through the A/D converter C22 to the image processor C24, where the signal is converted into an image signal. The output signal from the image processor C24 is fed to the image display C27, where a color image is reproduced from the signal.

As long as the power is supplied, the image pickup device C21 and the image display C27 are kept operating all the time, irrespective of the shooting mode. Accordingly, whether in shooting a still picture by means of the silver halide film or in shooting a moving picture by means of the CCD, the user can set the shooting angle while observing the image displayed on the image display C27. In MV or PM shooting mode, when the operation section COP is operated in a specific way, the output signal from the image processor C24 is also fed to the recording/reproducing section C25 so as to be recorded on the magnetic tape C28.

In PM mode, in which shooting by means of the silver halide film and shooting by means of the CCD are performed simultaneously, the first shooting section performs shooting only when, as described above, the shutter release button is operated, whereas the second shooting section in the mean time continues recording a moving picture onto the magnetic tape C28 regardless of the state of the shutter release button. Accordingly, in this mode, images recorded on the silver halide film as still pictures are part of sequential images recorded on the magnetic tape.

A change in the focal point of the taking lens L affects the focus condition of images in both the first and second shooting sections, whereas a change in the focal point of the relay optical system C14 affects the focus condition of images only in the second shooting section. Accordingly, focus adjustment with respect to the silver halide film C08 in the first shooting section can be achieved by the taking lens L, and focus adjustment with respect to the image pickup device C21 in the second shooting section can be achieved by the taking lens system L and the relay optical system C14. The focal point of the taking lens L and that of the relay optical system C14 can be set individually, if so desired, but, in the camera under discussion, their focal points are adjusted in the manner as described below in order to allow the second shooting section to be used as a viewfinder and to cope with requirements to be satisfied in specific shooting modes.

In PH mode, in which shooting is performed by means of the silver halide film alone, the focal point of the taking lens L is adjusted, as a matter of course, whereas, to bring the viewfinder image into focus, the focal point of the relay optical system C14 is fixed in a predetermined position. In PM mode, in which shooting by means of the silver halide film is performed during shooting by means of the CCD, it is necessary to bring the image of an object into focus with respect to the CCD and the silver halide film simultaneously. To achieve this, either the focal point of the taking lens L is adjusted in accordance with that of the relay optical system C14, or, just as in PH mode, only the focal point of the taking lens L is adjusted with the focal point of the relay optical system C14 fixed in the predetermined position.

In MV mode, in which shooting is performed by means of the CCD alone, either, just as in PH mode, only the focal point of the taking lens L is adjusted with the focal point of the relay optical system C14 fixed in the predetermined position, or only the focal point of the relay optical system C14 is adjusted with the focal point of the taking lens L fixed in a predetermined position. Since the CCD has a smaller image area, the relay optical system C14, as compared with the taking lens L, has a simpler construction and a lighter driving mechanism, and thus requires little electrical power to drive.

In bringing an image into focus in the first and second shooting sections simultaneously, the focal point of the taking lens L, which brings the light beam from an object into focus with respect to the first shooting section, varies with the object distance. Once the image of the object is brought into focus in the first shooting section, the focal point to which the relay optical system C14 needs to be set in order to bring the second shooting section into an in-focus state is determined definitely. On the other hand, in bringing an image into focus only in the second shooting section, the focal point of the relay optical system C14 varies with the object distance as well as the focal point of the taking lens L.

Thus, the focal point of the relay optical system C14 can be correlated to that of the taking lens L in such a way that the image in the second shooting section is kept in focus when the focus condition of the image in the first shooting section is varied from an out-of-focus state to an in-focus state. In the camera under discussion, such correlation between the focal point of the taking lens L and that of the relay optical system C14 is stored beforehand in the non-volatile memory C40. Accordingly, once the taking lens L is adjusted to a focal point that brings the image in the first shooting section into focus, it is possible, by calculation based on that focal point and the correlation stored in the non-volatile memory, to determine the focal point to which the relay optical system C14 needs to be set in order to keep the image in the second shooting section in focus.

The focal point to which the relay optical system C14 needs to be set in order to bring images into focus in both the first and second shooting sections at specific object distances is determined when the camera is designed. However, since small errors may arise in the assembly of the camera, it is preferable, rather than determining the focal-point correlation solely on the calculation basis in the design stage, to adjust the camera to cancel assembly errors. Specifically, after assembly, the actual focal-point correlation between the taking lens L and the relay optical system C14 that allows the images in the first and second shooting sections to be brought into focus simultaneously is measured in the following manner.

After the assembly of the camera, an inspection device having extremely high resolution is placed in the position of the silver halide film C08, and the camera is connected via the connector C32 to external adjustment equipment. From the external adjustment equipment, the camera is controlled to vary the focal point of the taking lens L, with its aperture diaphragms L11 open, as a test object is observed on the inspection device, in order to determine the focal point of the taking lens L at which it yields the sharpest image of the test object. Subsequently, with the focal point of the taking lens L kept in that position, imaging is performed by the CCD as the movable lenses of the relay optical system C14 are moved. Meanwhile, based on the data outputted from the A/D converter C22, the position of the movable lenses in which they yield an image with the highest contrast is determined and stored in the memory C40.

In AF focus control mode selected in PM shooting mode, where the image in the second shooting section is kept in focus normally by varying the focal point of the relay optical system C14, the focal point of the taking lens L is varied so that, while the AF module C02 is detecting the focus condition of the first shooting section, the focus condition of the image in the first shooting section is varied from an out-of-focus state to an in-focus state. In the meantime, the image in the first shooting section is brought into focus while the image in the second shooting section is kept in focus by controlling the focal point of the taking lens L and that of the relay optical system C14 based on the focal length f of the taking lens L, shift amounts of the focal plane and the movable lenses corresponding to the focal length f in an in-focus condition at arbitrary shooting distances from a shooting distance of infinity stored in the memory C40, and the detection signal from the AF module C02.

Next, the initial operations performed by the camera when the supply of power is started will be described below. When the main switch is operated to start the supply of power, the main microcomputer C01 tries to communicate with the lens microcomputer L06 to judge whether the taking lens L is mounted or not. When the taking lens L is not mounted, the main microcomputer C01 displays a warning message to that effect on the indicator C35. When the taking lens L is mounted, the main microcomputer C01 operates as follows.

(1) The main microcomputer C01 obtains from the lens microcomputer L06 information on the taking lens L itself, such as its type, open aperture value, minimum aperture value, and maximum and minimum focal lengths. Information on the type and the focal lengths of the taking lens L is essential to properly read from the memory C40 the correlation between the object distance and the focal point of the relay optical system C14. Subsequently, the main microcomputer C01 obtains information on the state of the AF/MF selecting switch L10.

(2) The main microcomputer C01 feeds a control signal for initialization to the lens microcomputer L06 so that the taking lens L is brought into its initial state. In response, the lens microcomputer L06 drives the zoom motor L07 to set the focal length to minimum or maximum, drives the focus motor L09 to set the focal point to infinity or to the closest position that corresponds to the closest possible shooting distance, and instructs the aperture controller L12 to open the aperture diaphragm L11.

(3) The main microcomputer C01 instructs the ND filter controller C15 to set the ND filter C13 to the full-transmittance state.

(4) The main microcomputer C01 instructs the relay optical system controller C19 to drive the movable lenses of the relay optical system C14 so that the focal point of the relay optical system C14 is set to the predetermined position, to infinity, or to the closest position.

(5) The main microcomputer C01 instructs the relay optical system controller C19 to open the aperture diaphragm C18 of the relay optical system C14.

(6) The main microcomputer C01 instructs the CCD driver C23 to drive the image pickup device C21 so that imaging and image-signal generation by the second shooting section is started.

(7) The main microcomputer C01 reads out the states of the various operation members of the operation section COP as well as the stored setting, and displays them on the indicator C35.

These initial operations set the first shooting section ready to shoot a still picture on the silver halide film and the second shooting section to record a moving picture. Thereafter, in accordance with the setting in the operation section COP and the state of the AF/MF selecting switch L10, appropriate modes and states of the camera are established so that shooting is performed in a specified way, by using the first shooting section or the second shooting section, or both.

For the first shooting section that is provided with the AF module C02, the focus condition is detected by the well-known phase-difference detection method. In this method, from the light having passed through the taking lens, two light beams that are symmetrically located about the optical axis are extracted so as to form images individually, and the thus formed images are compared with each other to analyze their positional relation. For image detection, a pair of line sensors are generally used. When the taking lens is in focus for a shooting object, each light beam forms an image in a fixed position on the line sensor. When the taking lens is in focus for a position nearer than the shooting object (front focus), the position at which each light beam forms an image comes closer to the optical axis of the taking lens. When the taking lens is in focus for a position farther than the shooting object (rear focus), the position at which each light beam forms an image goes away from the optical axis of the taking lens.

Accordingly, from the distance between the two detected images, it is possible to judge whether the taking lens is in focus for the shooting object or not, and, if not, it is judged whether the taking lens is in a front-focus or rear-focus state, and further how far the taking lens is out of focus.

In general, it is difficult or even impossible to detect the focus condition by the phase-difference detection method under the following conditions:

(1) When the shooting object has a repeated light-and-dark pattern, and the direction in which the pattern is repeated coincides with the direction in which the two line sensors are arranged, it is impossible to detect the focus condition. This is because, in such a case, an image having the same repeated pattern is formed on each line sensor, and it is impossible to judge which portion of one image corresponds to a particular portion of the other image.

(2) When the shooting object has extremely low contrast, the amount of light that reaches the line sensors is so uniform that the line sensors cannot determine where the object image is. As a result, it is difficult or impossible to detect the focus condition.

(3) When stray light, such as flare in backlit shooting, is present, the image of the shooting object formed on the line sensors cannot be distinguished from an image formed there by the stray light. As a result, it is difficult or impossible to detect the focus condition.

(4) When the taking lens is completely out of focus, the image of the shooting object is not at all formed on the line sensors, and accordingly it is impossible to detect the focus condition.

(5) In some cases, detection of the focus condition becomes impossible on account of the behavior of the aperture diaphragm. The positions in which the two light beams are extracted from the light having passed through the taking lens are usually not near the optical axis but away from it, because, as the distance between two imaging positions is longer, the focus condition can be detected more precisely. However, as the aperture diaphragm of the taking lens is stopped down to a narrower aperture, the light beams from the shooting object are at their periphery intercepted by the aperture diaphragm, and accordingly the line sensors receive the light beams only in limited portions of their image areas, or receive no light at all. Moreover, even when the focus condition detection is performed with the aperture diaphragm open, a similar problem arises with interchangeable lenses having large open aperture values.

Figure 2:
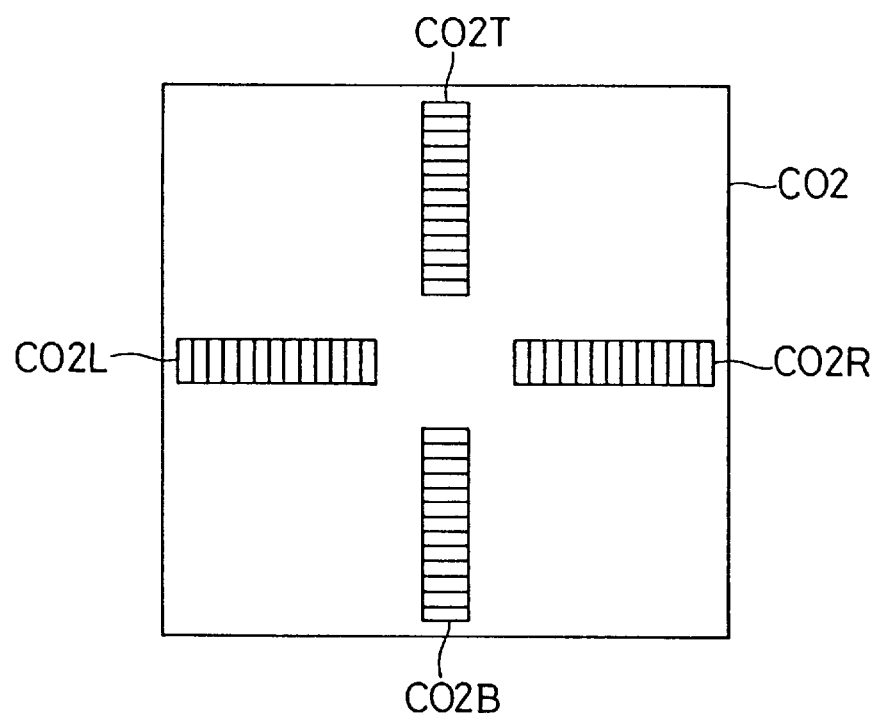
FIG. 2 is a diagram showing the arrangement of the line sensors in the AF module.

FIG. 2 shows the arrangement of the line sensors of the AF module C02. The AF module C02 has, on its light-receiving surface, a pair of line sensors C02R and C02L that are aligned horizontally and a pair of line sensors C02T and C02B that are aligned vertically. For each pair of line sensors, a pair of imaging lenses (not shown) are disposed in front of the sensors. From the light having passed through the taking lens L, two light beams traveling at the right-hand and left-hand edges are extracted by one pair of imaging lenses and directed to the right-hand and left-hand sensors C02R and C02L and two light beams traveling at the upper and lower edges are extracted by the other pair of imaging lenses and directed to the upper and lower sensors C02T and C02B so that an image is formed on each sensor. The light from the object on which the taking lens L is focused forms images in predetermined positions approximately at the centers of the individual line sensors C02R, C02L, C02T, and C02B.

Figure 3:
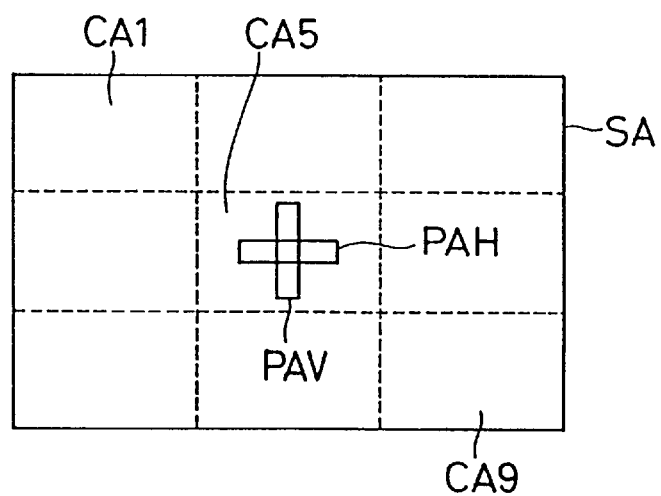
FIG. 3 is a diagram showing the positional relation between the entire area of an image to be shot and the partial image areas for focus-condition detection.

FIG. 3 shows the positional relation between the entire area of an image to be shot and the partial image areas for focus-condition detection. The right-hand and left-hand sensors C02R and C02L cover a horizontally extending area PAH at the center of the entire area SA of an image to be shot, and the upper and lower sensors C02T and C02B cover a vertically extending area PAV at the center of the entire area SA. Detection of the focus condition is performed on the basis of either the image within the area PAH or the image within the area PAV. Which of the areas PAH and PAV is to be used is selected by the user through operation of the operation section COP.

The main microcomputer C01 calculates a defocus amount by comparing the distance between images formed on one pair of line sensors, either C02R and C02R or C02T and C02B, with a reference distance which the two images are supposed to have between them when focus has been achieved, and, based on whether the calculated defocus amount is within a permissible limit or not, it judges whether focus has been achieved or not. Moreover, from the distance between the two images, the main microcomputer C01 also calculates the direction of defocus. Specifically, in a front-focus state, the image-to-image distance is shorter than the reference distance, and, in a rear-focus state, the image-to-image distance is longer than the reference distance.

For the second shooting section, the focus condition is detected by the well-known contrast detection method. In this method, over the entire area of an image to be shot or in a particular partial area thereof, brightness is detected spot by spot so that, based on differences in brightness between adjacent spots, that is, based on contrast, whether focus has been achieved or not is judged. To detect brightness, an area sensor is generally used. Within the area sensor, differences in the amount of received light between adjacent picture elements are calculated, and the sum total of the absolute values of those differences is used as a contrast value.

When the taking lens is in focus for a shooting object, a light ray from one point on the shooting object reaches only one picture element of the area sensor. Accordingly, the area sensor offers a correct measure of the contrast of the shooting object. As the contrast of the shooting object is higher, calculation yields a greater contrast value. When the taking lens is not in focus for the shooting object, the image of the shooting object is blurred, and accordingly a light ray from one point on the shooting object reaches more than one picture elements. In this case, even if the shooting object has high contrast, calculation yields a low contrast value.

The thus detected contrast not only depends on whether the taking lens is in focus for a shooting object nor not, but also varies with the contrast of the shooting object itself. This means that there exists no such reference contrast value that indicates the in-focus state. Accordingly, in the contrast detecting method, one-time detection of contrast is not sufficient to judge whether focus have been achieved or not, or to determine the direction of defocus, that is, whether the focus condition is in a front-focus or rear-focus state. Here, detection of contrast needs to be repeated once again with a different focal point of the lens so that two contrast values can be compared in order to make it possible to judge whether the lens is in focus or not, and to determine the direction of defocus indirectly from the direction in which the focal point of the lens is shifted.

In general, it is difficult or even impossible to detect the focus condition by the contrast detection method under the following conditions:

(1) When the shooting object has very low contrast, the contrast value can be calculated, but it does not vary significantly even if the focal point of the taking lens is varied, and thus it is impossible to detect the focus condition.

(2) When the taking lens is completely out of focus, the contrast value does not vary significantly even if the focal point of the taking lens is varied, and thus it is impossible to detect the focus condition.

In the camera under discussion, the CCD image pickup device C21 serves as the area sensor for detecting contrast. To detect the in-focus state, the movable lenses of the relay optical system C14 are moved forward and backward with respect to its original position, and meanwhile the image signal from the image processor C24 is monitored to detect variation in its contrast. A maximum contrast is obtained when a perfect in-focus condition is achieved. The main microcomputer C01 calculates a defocus amount from the variation in the contrast value, and, based on whether the defocus amount is within a permissible limit or not, it judges whether focus has been achieved or not.

Detection of contrast is performed either for the entire area of an image to be shot or for a particular partial area thereof. FIG. 3 shows the partial areas for contrast detection. As indicated by broken lines, the entire shooting area SA is divided into nine partial areas CA1 to CA9 arranged in three rows and in three columns. Though not shown in the figure, the operation section COP is provided with a touch panel so that, when the user touches a particular portion of the touch panel, the corresponding partial area out of the partial areas CA1 to CA9 is selected as the area for contrast detection.

When contrast detection is performed for the entire area SA, the main microcomputer C01 uses the whole image signal fed from the image processor C24 to calculate differences in the amount of received light between adjacent picture elements and obtain the sum total of the absolute values of those differences as the contrast value. When contrast detection is performed for one of the partial areas CA1 to CA9, the main microcomputer C01 extracts that part of the image signal which corresponds to the selected partial area in order to calculate, only with the extracted part of the image signal, differences in the amount of received light between adjacent picture elements and obtain the sum total of the absolute values of those differences as the contrast value.

Of the partial areas CA1 to CA9, the central partial area CA5 includes the areas PAH and PAV that are used to detect the focus condition in the first shooting section, and accordingly the image formed in this area CA5 is used both for focus-condition detection in the first shooting section and for focus-condition detection in the second shooting section. In other words, that part of the image of an object which is formed outside the area CA5 is not considered in focus-condition detection by the AF module C02 of the first shooting section, and is used exclusively for focus-condition detection in the second shooting section.

Although, in the camera under discussion, the partial areas for focus-condition detection by the first shooting section are located at the center of the shooting area, it is also possible to provide, in addition to the line sensors C02R, C02L, C02T, and C02B shown in FIG. 2, more line sensors so that focus condition can be detected also for other partial areas than the central partial area within the shooting area. In this case, it is possible through operation of the above-mentioned touch panel to select the partial area for which the first shooting section performs focus-condition detection.

In the first shooting section, whether the taking lens L is in focus or not is judged, as described above, from whether the defocus amount DF is within a permissible limit or not. In the camera under discussion, two limits having different values are defined for specific shooting modes. Specifically, in PH mode, in which shooting is performed by means of the silver halide film alone, a first limit having a relatively small value is used; in MV mode, in which shooting is performed by means of the CCD alone, a second limit having a relatively large value is used. In PM mode, in which shooting is performed by means of both the silver halide film and the CCD, the first limit is used in a period after issuance of an S1ON signal (triggered by half-pressing of the shutter release button) that commands shooting of a picture on the silver halide film until completion of shooting of that picture, and otherwise, that is, while shooting is performed by means of the CCD alone, the second limit is used.

When, on account of improper setting of the focal point, a light beam forms an image in front of or behind the plane on which it is supposed to form a point image, the formed image is no more a point image but a circular image. In cases where an image is made up of a countless number of continuous points as in a silver halide photograph, even if the individual points are blurred and formed as circular images, the blurring of the entire image is not perceived by the human eye. The upper limit of the diameter of such blurred circular images is called the permissible circle of confusion, and that deviation of the focal point which corresponds to a specific permissible circle of confusion is called the depth of focus.

It is generally accepted that, in a photograph using a 135-format silver halide film, the permissible circle of confusion is around 33 $\mu$m. The interval between silver halide particles in silver halide film is far smaller than this value, and accordingly silver halide film can offer higher resolution as the focus is adjusted more precisely. However, above a certain degree of resolution, the human eye cannot any more recognize the difference in resolution. On the other hand, the interval between picture elements of a CCD is larger, specifically it is on the order of microns with typical CCDs for use as image pickup devices. A CCD, therefore, cannot offer higher resolution than can be attained with the interval between its picture elements, and accordingly it is meaningless to seek extremely high precision in focus adjustment.

Moreover, silver halide film is used exclusively for shooting still pictures, whereas a CCD is used chiefly for shooting moving pictures. The human eye's ability to distinguish adjacent two points is far higher in a still picture than in a moving picture. Accordingly, it is meaningless to seek extremely high precision in focus adjustment.

For these reasons, in the camera under discussion, the first and second shooting sections use different permissible limits of the defocus amount. In other words, the first and second permissible limits are defined in consideration of the depth of focus required in each shooting section.

The first permissible limit DF1 and the second permissible limit DF2 for the defocus amount DF are respectively defined by formulae (1) and (2) below (note that the defocus amount DF here represents that as measured on the surface of film):

$$DF1 = FNo1 \times \delta g \quad (1)$$

$$DF2 = FNo2 \times \delta v \times (1/\beta)^2 \quad (2)$$

where FNo1 represents the aperture value of the taking lens L during shooting, FNo2 represents the aperture value of the aperture diaphragm C18 of the relay optical system C14 during shooting, $\delta g$ and $\delta v$ represent the diameters of the permissible circles of confusion of the silver halide film and the CCD, respectively, and $\beta$ represents the magnification of the relay optical system C14. For example, if the screen on the film is to be magnified by a factor of ¼ (reduction in size), then $\beta$=¼. The reason whey $\beta$ is converted into its reciprocal (1/$\beta$) here is that $\beta$ is observed as (1/$\beta$) on the surface of the film. The permissible circle of confusion of the CCD is set to be one order greater than that of the silver halide film, and accordingly the second permissible limit DF2 is wider than the first permissible limit.

The term of (1/$\beta$) raised to the second power in formula (2) is necessary to make conversion of the defocus amount DF possible in a camera as the one under discussion where the defocus amount DF in the first shooting section is detected and used for focus-condition detection in the second shooting section. In a construction where the defocus amount of the second shooting section is detected directly, there is no need to include the term of (1/$\beta$) in formula (2).

As described earlier, the focus condition of the image in the first shooting section is detected by the phase-difference detection method, and that of the image in the second shooting section is detected by the contrast detection method. The focus detection in the first and second shooting sections can be performed simultaneously, and, in the camera under discussion, detection of the focus condition is controlled correlatively together with adjustment of the focus.

In PH mode, adjustment of the focus is performed mainly on the basis of the focus condition in the first shooting section, and the focus condition in the second shooting section is only referred to in case the focus condition in the first shooting section cannot be detected. In this mode, the focus condition of the image in the first shooting section coincides with that of the image in the second shooting section. Accordingly, adjustment of the focus can be achieved on the basis of either the focus condition in the first shooting section or that in the second shooting section. However, it is preferable to perform focus adjustment on the basis of the focus condition in the first shooting section because the phase-difference detection method can not only detect the focus condition more precisely but also detect the direction of defocus directly. This focus adjustment method can also be used in PM mode.

The focus condition in the second shooting section is referred to, for example, when a shooting object has a repeated light-and-dark pattern and accordingly it is not possible to determine correspondence of portions between the two images formed on the line sensors, or when the user, by operating the touch panel in the operation section COP, has specified a partial area other than the central partial area CA5 (FIG. 3) as the partial area for focus-condition detection. In either case, it is impossible to detect the focus condition in the first shooting section.

When, in MV mode, the focal point of the taking lens L is kept in a fixed position while that of the relay optical system C14 is varied, adjustment of the focus is achieved mainly on the basis of the focus condition in the second shooting section, and the focus condition in the first shooting section is only referred to in case the focus condition in the second shooting section cannot be detected. This is because, in this mode, the focus condition of the image in the first shooting section normally does not coincide with that of the image in the second shooting section.

Note that the focus condition in the first shooting section can be used in PM or MV mode to determine the defocus direction, even when the focal point of the relay optical system C14 is kept in the fixed in-focus position as described previously, or even in a construction that does not allow the relay optical system to vary its focal point. Though the defocus direction cannot be detected directly by the contrast detection method, the defocus direction in the second shooting section is known from the defocus direction information obtained as a result of focus-condition detection in the first shooting section.

During normal shooting of a movie in PM mode, the focal point of the taking lens L is kept in the infinity position, and focusing is achieved by varying the focal point of the relay optical system C14 on the basis of the focus condition in the second shooting section. During shooting by means of the silver halide film, the focal point of the taking lens L is varied on the basis of the focus condition in the first shooting section so that the image in the first shooting section is brought into focus while the image in the second shooting section is kept in focus.

A situation where the focus condition can be detected only in the first shooting section but not in the second shooting section occurs, for example, when the main shooting object is small and the entire image area is specified as the target area for contrast detection. In this case, the shooting object does not add much to the contrast value, and accordingly, if the shooting object is out of focus above a certain degree, the contrast value no more varies significantly with the back-and-forth movement of the movable lenses of the relay optical system C14. Thus, it is impossible to detect the focus condition in the second shooting section. On the other hand, it is possible to detect the focus condition in the first shooting section, only if the main shooting object is caught in the detection area PAH or PAV (FIG. 3).

In PH mode, in which shooting is performed by the first shooting section by means of the silver halide film, if the focus condition of the image in the first shooting section cannot be detected, it is possible, by varying the focal point from one end to the other, to search for a focal point in which focus-condition detection is possible. This is called the low-contrast scan. Note however that, in the camera under discussion, instead of varying the focal point of the taking lens L, the position of the movable lenses of the relay optical system C14 is varied, with the focal point of the taking lens L kept fixed in a predetermined position. The reasons are that, since the movable lenses of the relay optical system C14 are small-size and light-weight, they require little electric power to drive, and that, since the movement distance from one end to the other is short, the focal point can be varied over the entire range in a short time.

In the above operation, the focus condition of the image in the first shooting section does not vary, whereas that of the image in the second shooting section varies. As described earlier, the main microcomputer C01 is provided with the memory C40 in which the correlation between the focal length f of the taking lens L and the focal point (movement amount) of the relay optical system C14 is stored. Accordingly, when detection of the focus condition is possible in the second shooting section, it is possible, from the focal point of the relay optical system C14 at that time and the correlation stored in the memory C40, to calculate the focal point to which the taking lens L needs to be set in order to bring the image in the first shooting section into or close to focus. Thus, it is possible to detect also the focus condition of the image in the first shooting section.

Even when the focal point of the relay optical system C14 is kept in the fixed in-focus position as described previously, or even in a construction that does not allow the relay optical system to vary its focal point, it is possible to calculate, from the contrast information obtained from the second shooting section during a low-contrast scan, the focal point to which the taking lens L needs to be set in order to bring the image in the first shooting section into or close to focus.

Figure 4:
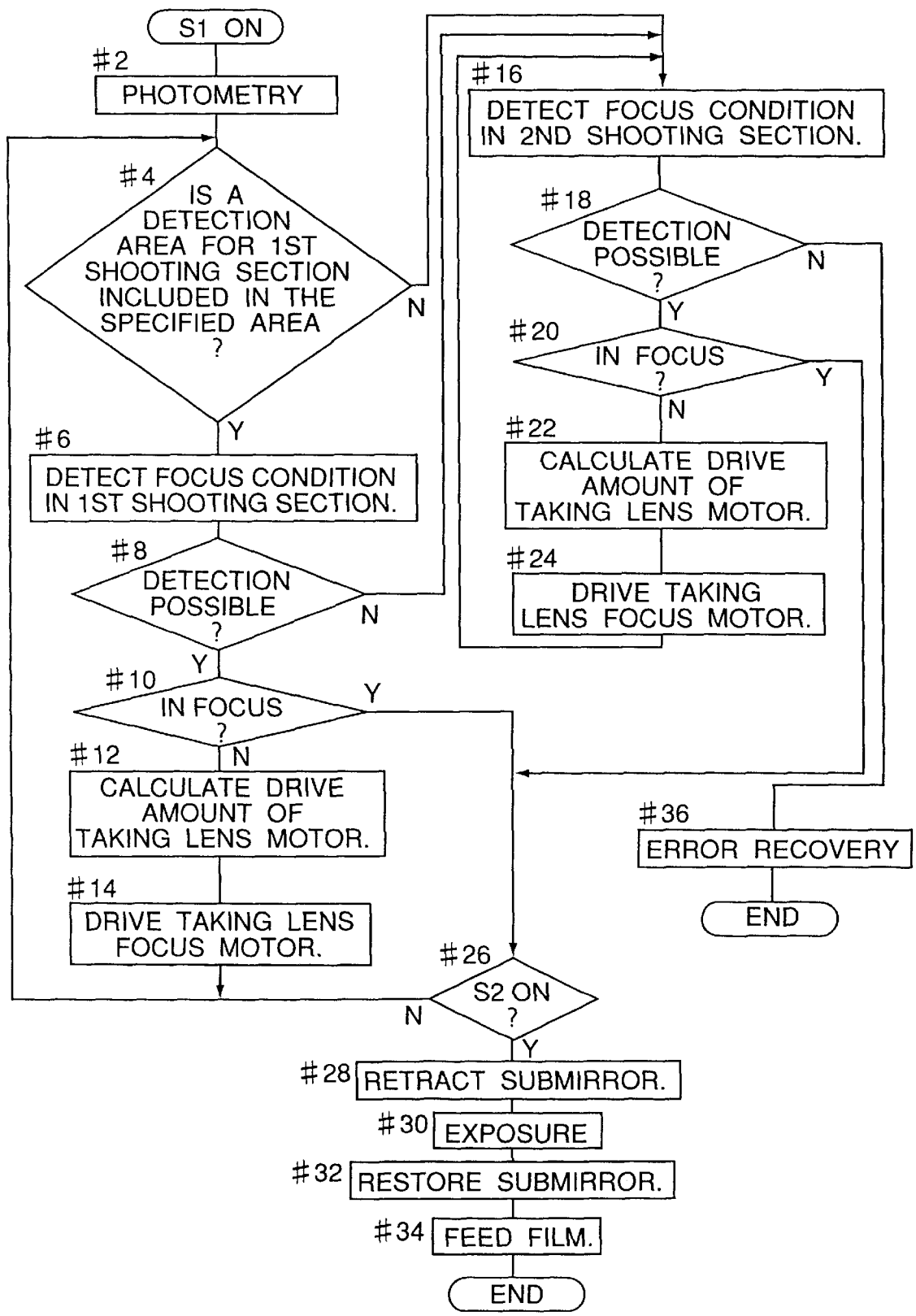
FIG. 4 is a flowchart showing the procedure for controlling focusing in PH mode, in which shooting is performed by means of the silver halide film.

The procedure for detecting focus condition and controlling focus adjustment in AF focus adjustment mode will be described below, with reference to the flowcharts in FIGS. 4 to 7. FIG. 4 is a flowchart showing the procedure followed in PH shooting mode, in which shooting is performed by means of the silver halide film alone. In this mode, the focal point of the relay optical system C14 is fixed. When the shutter release button is half-pressed (first stroke), an S1ON signal that requests the starting of focus adjustment is issued. In response, the main microcomputer C01 measures the brightness of the light reflected from the shutter C07 by reading the output of the AE sensor C03 (step #2). Subsequently, the main microcomputer C01 judges whether or not the area PAH or PAV for focus-condition detection in the first shooting section is included in the detection area specified by the user (#4), and, if not, the procedure proceeds to #16.

If the area PAH or PAV is included in the user-specified area, the main microcomputer C01 detects the focus condition of the image in the first shooting section by reading the output of the AF module C02 (#6). Specifically, by reading the outputs from the line sensors C02R and C02L or C02T and C02B in accordance with which detection area, PAH or PAV, is selected, the main microcomputer C01 calculates the contrast of the images formed on the line sensors. Here, the positional correlation between the two images is analyzed to determine such positions in which they yield the least contrast difference and thus to calculate the image-to-image distance under that condition. From the calculated image-to-image distance, a predetermined reference image-to-image distance in the in-focus state is subtracted, and the absolute value of the obtained difference is used as the defocus amount. The sign of the obtained difference denotes the direction of defocus.

Next, whether detection of the focus condition has been successful in the above operation or not is judged (#8). Detection may fail when the images have extremely low contrast, or when positions in which the two images yield the least contrast difference cannot be determined definitely, specifically when the object has a repeated light-and-dark pattern. If detection has been successful, whether the taking lens L is in focus or not is judged by comparing the obtained defocus amount with a predetermined reference value (#10).

If the detected defocus amount is above the predetermined value, the taking lens L is judged to be out of focus, and, on the basis of the focal length of the taking lens L at that time and the detected defocus amount, the drive amount of the focus motor L09 of the taking lens L is calculated (#12). The focus motor L09 is then driven by the calculated amount to vary the focal point of the taking lens L accordingly (#14), and the procedure returns to #4.

If, in #10, the detected defocus amount has been within the predetermined value, the taking lens L is judged to be in focus, and then it is judged whether an S2ON signal that is issued when the shutter release button is fully pressed (second stroke) is present or not (#26). If an S2ON signal is not present, the procedure returns to #4. If an S2ON signal is present, shooting is performed by means of the silver halide film. Specifically, the submirror C05 is retracted (#28), and the shutter C07 is opened to expose the film C08 to light (#30). If, based on the output of the AE sensor C03, the amount of light from the object is judged to be insufficient, the flash and light F is fired during exposure to properly illuminate the object. After film exposure, the submirror is restored (#32), the silver halide film C08 is fed one frame forward (#34) in preparation for a next shot, and the procedure is terminated.

If, in #8, detection of the focus condition is judged to have been unsuccessful, the focus condition of the image in the second shooting section is detected (#16). Specifically, for the area specified for detection, the contrast value at that time is calculated, and further the taking lens L is moved a predetermined minute distance forward and backward to calculate the contrast value in each position. The contrast value before the movement of the taking lens L is subtracted from the larger one of the contrast values after the movement, and the obtained difference is used as the defocus amount. Moreover, the obtained difference is divided by the contrast value before the movement of the taking lens L, and the obtained result is used as a contrast variation factor. The direction of defocus is determined according to which direction of movement, forward or backward, of the taking lens L has resulted in a higher contrast value. If the two contrast values after the movement are both lower than the contrast value before the movement, the taking lens L is judged to be in focus.

Next, whether detection of the focus condition has been successful in the above operation or not is judged (#18). Detection may fail when the image has extremely low contrast, or when the movement of the taking lens L does not yield any difference in the contrast value, or when the contrast values obtained when the taking lens L is moved forward and backward are equal. If detection has been unsuccessful, in order to recover from the error, a message indicating that detection of the focus condition is impossible is displayed on the indicator C35 (#36) to prompt the user to adjust focus manually in MF mode, and the procedure is terminated.

If, in #18, detection is judged to have been successful, the calculated defocus amount is compared with a predetermined reference value to judge whether the taking lens L is in focus or not (#20). If the defocus amount is above the predetermined value, the taking lens L is judged to be out of focus, and, based on the defocus amount and the contrast variation factor, the drive amount of the focus motor L09 of the taking lens L is calculated (#22) to drive the focus motor L09 accordingly (#24). Thereafter, the procedure returns to #16 to repeat the operations.

If the defocus amount is within the predetermined value, the taking lens L is judged to be in focus, and the procedure proceeds to #26 to perform the operations described earlier. If, in #26, an S2ON signal is not present, that is, no shooting is going to take place, the procedure returns to #4 to repeat the operations. In this way, only when detection of the focus condition of the image in the first shooting section is impossible, focus adjustment is performed on the basis of the focus condition in the second shooting section. Thus, by giving priority to focus-condition detection by the phase-difference method that offers higher precision, it is possible to take full advantage of high resolution that characterizes silver halide film shooting. Note that, when the taking lens L is judged to be in focus in #20, it is also possible, instead of proceeding to #26, to return to #4. This allows the focus condition in the first shooting section to be checked again by the phase-difference detection method, and thus ensures the above advantage.

Figure 5:
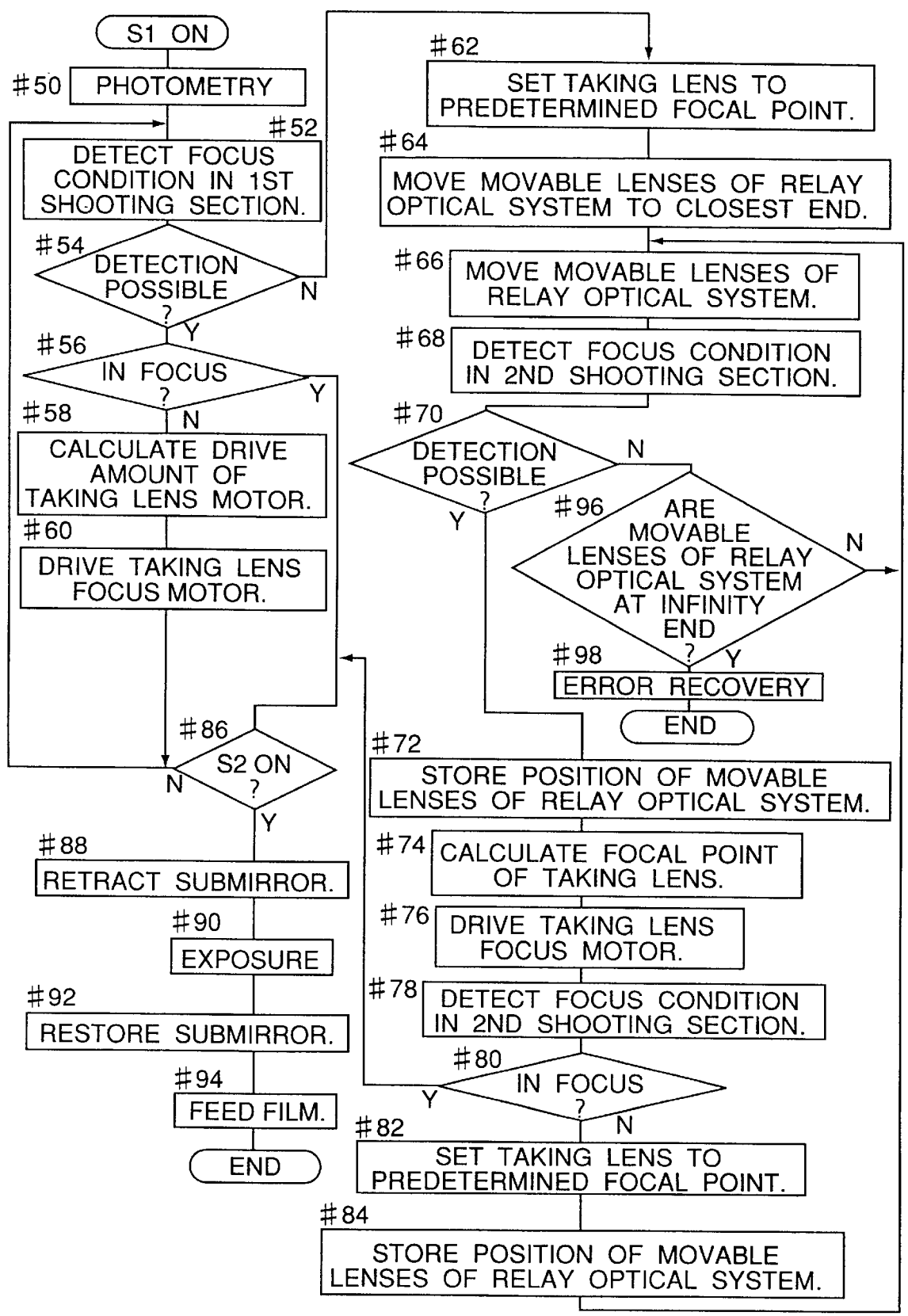
FIG. 5 is a flowchart showing the procedure for controlling focusing that is performed to search for a detectable focal point by varying the focal point of the relay optical system in PH mode.

FIG. 5 shows the procedure, followed in PH mode when the focus condition in the first shooting section cannot be detected, for varying the focal point of the relay optical system C14 to search for a focal point at which focus-condition detection is possible. When an S1ON signal that requests the starting of focus adjustment is issued, the main microcomputer C01 measures, by reading the output of the AE sensor C03, the brightness of the image in the first shooting section (step #50), and detects, by reading the output of the AF module C02, the focus condition of the image in the first shooting section (#52). Subsequently, whether detection of the focus condition has been successful or not is judged (#54), and, if detection is judged to have been successful, then whether the taking lens L is in focus or not is judged (#56).

If the taking lens L is out of focus, the drive amount of the focus motor L09 is calculated, and the focus motor L09 is driven accordingly (#58, #60) to vary the focal point of the taking lens L. If the taking lens L is in focus, the procedure proceeds to #86, so that, if an S2ON signal is present, shooting is performed by means of the silver halide film (#88 to #94), and, if not, the procedure returns to #52. Detection of the focus condition and adjustment of the focus in #52 to #60 and shooting in #88 to #94 are performed in the same way as #6 to #14 and #28 to #34 in FIG. 4, respectively.

If, in #54, detection of the focus condition is judged to have been unsuccessful, the focal point of the taking lens L is moved to a predetermined position, for example, to the position corresponding to the middle point of the possible shooting range (#62), and the movable lenses of the relay optical system C14 are moved to the closest end, that is, to the position corresponding to the closest possible shooting distance (#64). In this state, in preparation for focus-condition detection, the contrast value of the image in the second shooting section is calculated. Here, contrast is detected with respect to the entire image area of the second shooting section or a specified partial area.

Then, the movable lenses of the relay optical system C14 are moved a predetermined minute distance without varying the focal point of the taking lens L (#66), and the contrast of the image in the second shooting section is calculated to detect the focus condition (#68). Whether detection of the focus condition has been successful or not is judged (#70), and, if not, whether or not the movable lenses are at the infinity end that corresponds to the farthest possible shooting distance is judged (#96).

If the movable lenses are not at the infinity end, the procedure returns to #66 to continue the shifting of the movable lenses and detection of the focus condition. If the movable lenses are at the infinity end, it means that it has been impossible, even by moving the movable lenses over the entire range, to find a position in which the image in the second shooting section can be brought into focus. In this case, in order to recover from the error, a message indicating that focus-condition detection is impossible is displayed on the indicator C35 (#98) to prompt the user to adjust focus in MF mode, and the procedure is terminated.

If, in #70, detection of the focus condition is judged to have been successful, the position of the movable lenses at that time is stored (#72). Moreover, based on the focal point of the relay optical system C14 at that time, the focal point of the taking lens L as specified then, the correlation between the focal points of the taking lens L and the relay optical system C14 as stored in the memory C40, and the defocus amount calculated in #68, the focal point to which the taking lens L needs to be set in order to bring an object into focus in the first shooting section is calculated (#74), so that the focus motor L09 is driven to set the taking lens L to the calculated focal point, and simultaneously the relay optical system is moved to the in-focus position (#76).

In this state, where the image in the second shooting section is supposed to be also in focus, the focus condition of the image in the second shooting section is detected again (#78) to ensure that it is really in focus (#80), and then the procedure proceeds to #86 to perform the operations described earlier. In some cases, for example, when the defocus amount calculated in #68 contains an error, or when the object has moved, it may be judged in #80 that an in-focus condition is not achieved. In this case, the focal point of the taking lens L is moved back to the predetermined position set in #62 (#82), the movable lenses of the relay optical system C14 is moved back to the position stored in #72 (#84), and then the procedure returns to #66 to restart the shifting of the movable lenses and detection of the focus condition.

The focus-condition detection method shown in FIG. 5 is useful to cope with such cases where detection of the focus condition of the image in the first shooting section has failed on account of a large deviation of the focal point of the taking lens L from the object, or where the object has low contrast. Since, compared with varying the focal point of the taking lens L, moving the movable lenses of the relay optical system C14, which are small and light, requires less electric power and a shorter movement distance, it is possible to effectively find out the focal point at which the focus condition can be detected.

Figure 6:
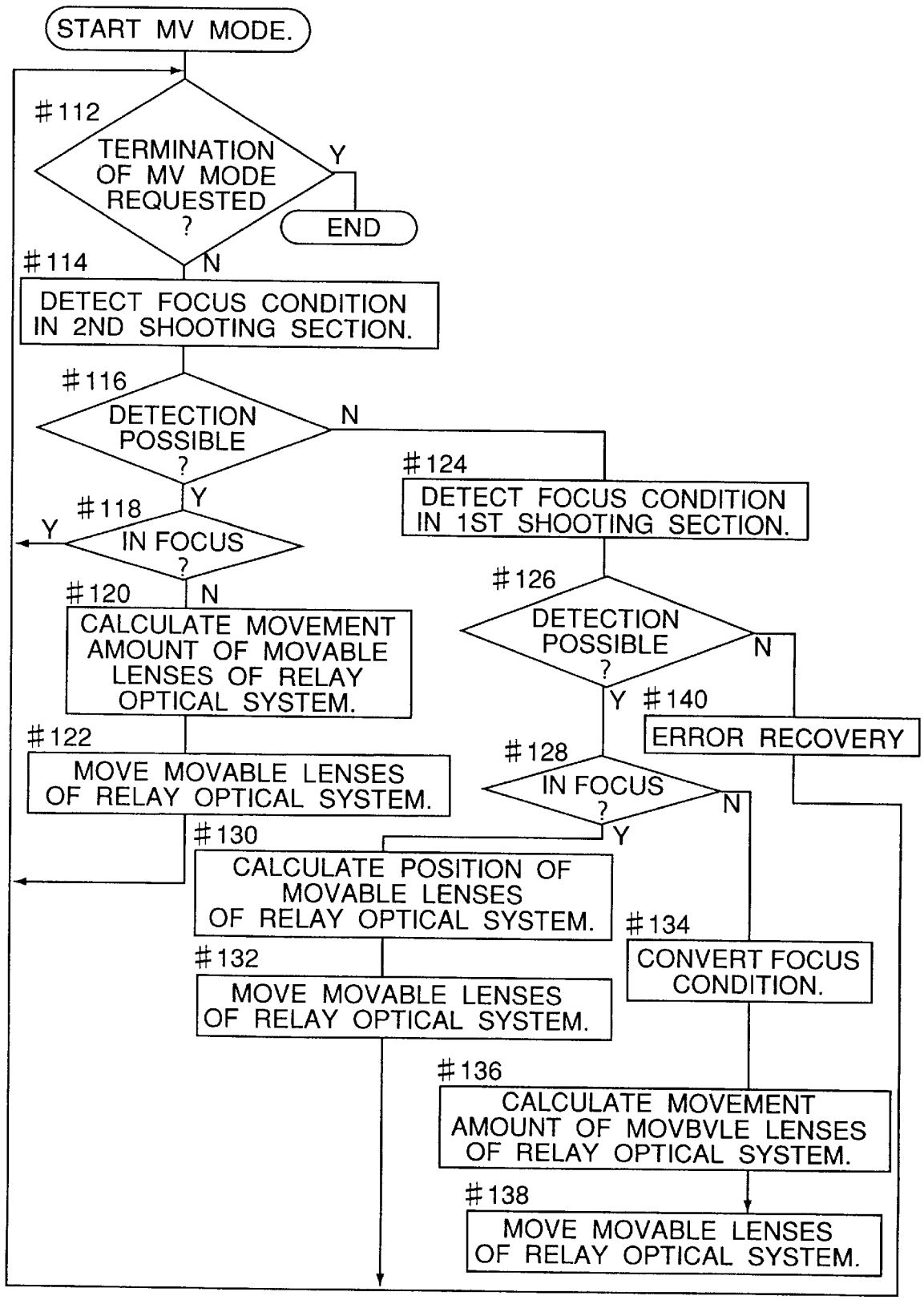
FIG. 6 is a flowchart showing the procedure for controlling focusing in MV mode, in which shooting is performed by means of the CCD.

FIG. 6 shows the procedure, followed in MV mode for shooting video movies, for varying the focal point of the relay optical system C14 with the focal point of the taking lens L fixed. When MV mode is established, whether termination of MV mode is requested through operation of the operation section or not is judged (step #112), and, if not, the focus condition of the image in the second shooting section is detected (#114).

Specifically, for the specified detection area, the contrast value is calculated with the movable lenses of the relay optical system C14 fixed in the specified position, and further the movable lenses are moved a predetermined minute distance forward and backward to calculate the contrast value in each position. The contrast value before the movement of the movable lenses is subtracted from the larger one of the contrast values after the movement, and the obtained difference is used as the defocus amount. Moreover, the obtained difference is divided by the contrast value before the movement of the movable lenses, and the obtained result is used as the contrast variation factor. The direction of defocus is determined according to which direction of movement, forward or backward, of the movable lenses has resulted in a higher contrast value.

Next, whether detection of the focus condition in the above operation has been successful or not is judged (#116). If detection has been successful, the calculated defocus amount is compared with a predetermined reference value to judge whether an in-focus condition is achieved or not (#118). If the defocus amount is within the predetermined value, it is judged that an in-focus condition is achieved, and the procedure returns to #112. If the defocus amount is above the predetermined value, it is judged that an in-focus condition is not achieved. In this case, based on the defocus amount and the contrast variation factor, the movement amount by which the movable lenses of the relay optical system C14 need to be moved is calculated (#120) to move the movable lenses accordingly (#122). Then, the procedure returns to #112.

If, in #116, detection is judged to have been unsuccessful, the focus condition of the image in the first shooting section is detected (#124) to judge whether such detection is possible or not (#126). If such detection is impossible, in order to recover from the error, a message indicating that focus-condition detection is impossible is displayed on the indicator C35 (#140), and then the procedure returns to #112.

If detection is judged to have been successful, the calculated defocus amount is compared with a predetermined reference value to judge whether the taking lens L is in focus or not (#128). If the defocus amount is within the predetermined value, the taking lens L is judged to be in focus. In this case, based on the specified focal point of the taking lens L and the movement amount correlation stored in the memory C40, the focal point of the relay optical system C14 is determined and the position of the movable lenses is calculated (#130) so that the movable lenses are moved to the calculated position (#132). Then, the procedure returns to #112.

If the defocus amount is above the predetermined value, the taking lens L is judged to be out of focus, and the focus condition detected in the first shooting section is converted into the corresponding focus condition in the second shooting section (#134). In this conversion, the specified focal point of the taking lens L, the specified focal point of the relay optical system C14, the correlation between the focal points as stored in the memory C40, and the defocus amount are taken into consideration. Based on the defocus amount obtained by conversion, the movement amount by which the movable lenses of the relay optical system C14 need to be moved is calculated (#136) so that the movable lenses are moved accordingly (#138). Then, the procedure returns to #112.

In the above operation, since the focal point of the taking lens L is not varied, the focus condition of the image in the first shooting section normally does not coincide with that in the second shooting section, and, what is more, the focus condition of the image in the first shooting section does not vary unless the object or the user moves. Accordingly, rather than continuing focus adjustment on the basis of the focus condition of the image in the first shooting section, it is preferable to perform focus adjustment on the basis of the focus condition of the image in the second shooting section as long as it is possible. This is the reason why, after step #132 and #138 where the movable lenses of the relay optical system C14 are moved, the procedure returns not to #124 but to #112.

In the camera under discussion, if focus-condition detection is impossible in both the first and second shooting sections, an error message is displayed, and the procedure returns to #112 without performing focus adjustment. This is because detection of the focus condition may become possible any time in either of the shooting sections as a result of the movement of the object or the movement of the user who has recognized the error message. Note that the starting or ending of recording does not affect the focusing procedure, except that recording is terminated as soon as MV mode is terminated.

Figure 7:
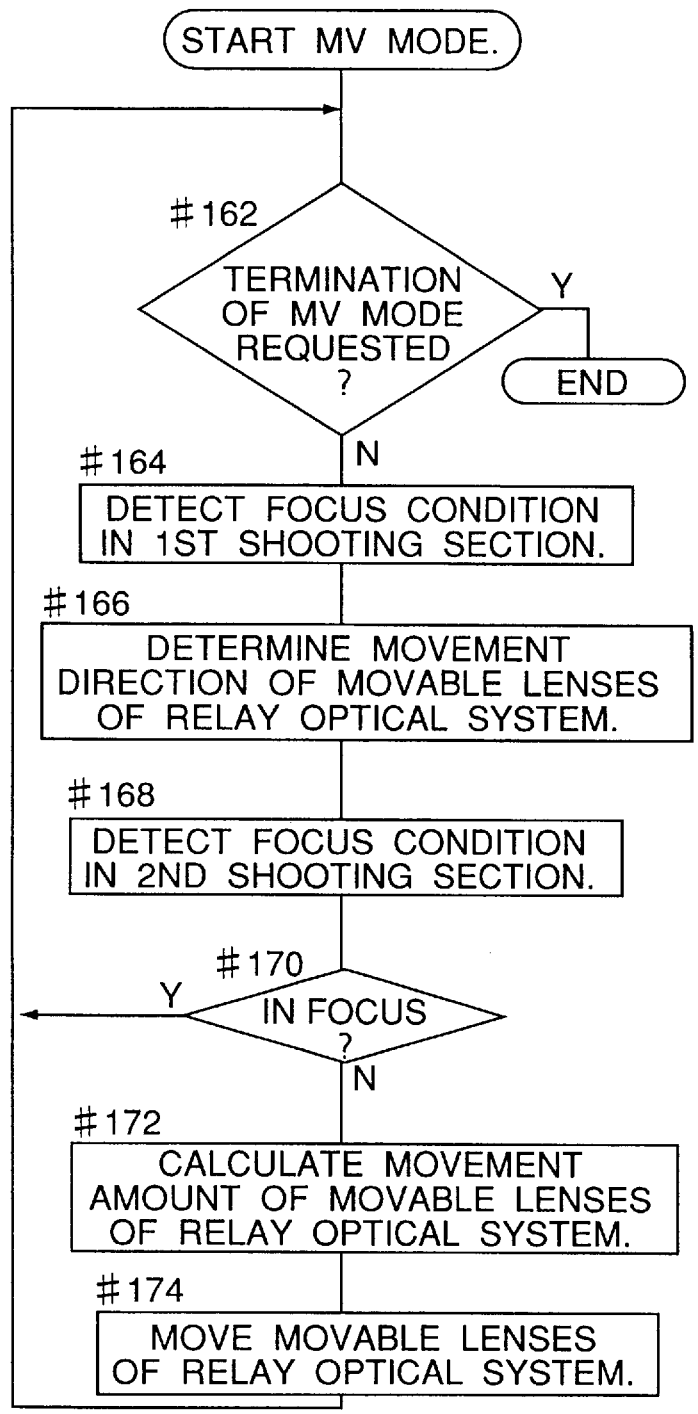
FIG. 7 is a flowchart showing another procedure for controlling focusing in MV mode.

FIG. 7 shows another procedure, followed in MV mode for video movie shooting, for varying the focal point of the relay optical system C14 with the focal point of the taking lens L fixed. When MV mode is established, whether termination of MV mode is requested through operation of the operation section or not is judged (step #162), and, if not, the focus condition of the image in the first shooting section is detected by the phase-detection method (#164). Then, based on the calculated defocus amount, the direction in which the movable lenses of the relay optical system C14 need to be moved is determined (#166).

Next, the focus condition in the second shooting section is detected (#168). Specifically, the movable lenses are moved a predetermined minute distance in the direction determined in #166 to detect the contrast in that position, and the contrast value before the movement is subtracted from that after the movement to obtain the defocus amount. Moreover, the contrast variation factor is calculated. The defocus amount is compared with a predetermined value to judge whether an in-focus condition is achieved or not (#170), and, if achieved, the procedure returns to #162. If an in-focus condition is not achieved, then, based on the defocus amount and the contrast variation factor, the movement amount by which the movable lenses of the relay optical system C14 need to be moved is calculated (#172), and the movable lenses are moved accordingly. Then, the procedure returns to #162.

In the above operation, the direction of defocus of the image in the second shooting section is obtained without moving the movable lenses both forward and backward, and thus it is possible to reduce the time required for focus-condition detection. However, this method is applicable only to such cases where the focus-condition detection area for the first shooting section is included in that for the second shooting section.

As described earlier, the camera under discussion is capable of shooting more than one frames continuously in PH and PM modes. The procedure for focus adjustment in continuous shooting mode will be described below, with reference to the flowcharts in FIGS. 8 and 9. Here, it is assumed that continuous shooting is performed in PH mode, for example.

Figure 8:
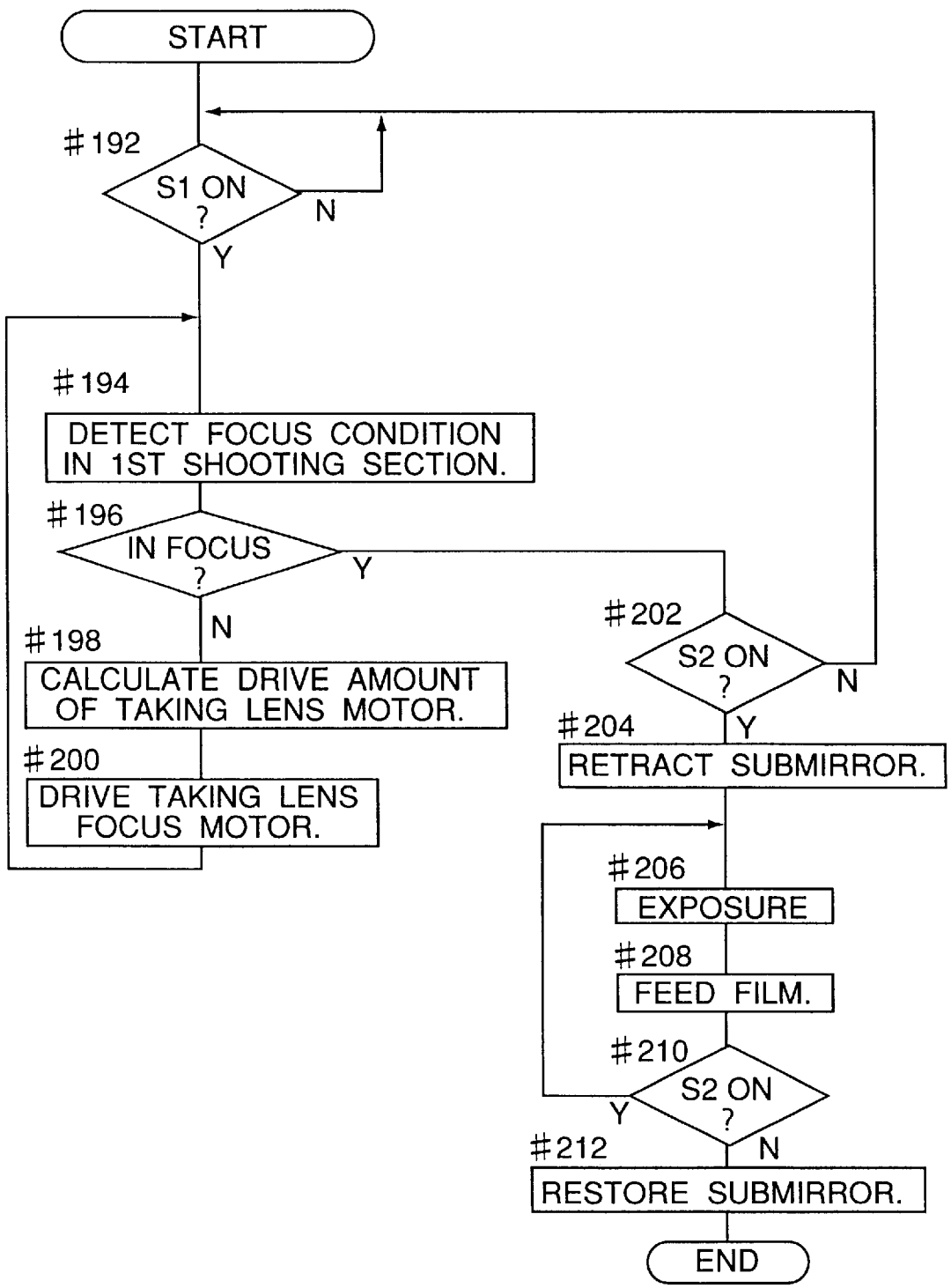
FIG. 8 is a flowchart showing the first procedure for controlling focusing when shooting is performed by means of the silver halide film in continuous shooting mode.

FIG. 8 shows the first procedure followed in continuous-shooting mode. At the outset of the procedure, the main microcomputer C01 waits for an S1ON signal that is issued to request the starting of focus adjustment when the shutter release button is half-pressed (first stroke) (step #192). When an S1ON signal is issued, the microcomputer C01 detects, by reading the output of the AF module C02, the defocus amount of the image in the first shooting section (#194), and then compares the detected defocus amount with a predetermined value to judge whether the taking lens L is in focus or not (#196).

If the defocus amount is above the predetermined value, the taking lens L is judged to be out of focus. In this case, based on the focal length of the taking lens L at that time and the detected defocus amount, the drive amount of the focus motor L09 of the taking lens L is calculated (#198), and the focus motor L09 is driven accordingly to vary the focal point of the taking lens L (#200). Then, the procedure returns to #194. If, in #196, the detected defocus amount is within the predetermined value, the taking lens L is judged to be in focus, and whether an S2ON signal that is issued when the shutter release button is fully pressed (second stroke) is present or not (#202). If an S2ON signal is not present, the procedure returns to #192.

If, in #202, an S2ON signal is present, the main microcomputer C01 retracts the submirror C05 (#204), and opens the shutter C07 to expose the film C08 to light (#206). During exposure, the flash and light F is fired if the amount of light from the object is insufficient. After exposure, the film is fed one frame forward (#208), and then whether the S2ON signal is still present or not is judged (#210). If the S2ON signal is still present, the procedure returns to #206 to repeat the exposure and feeding of the film. When the shutter release button is released, and accordingly the S2ON signal disappears, the submirror C05 is restored (#212), and thus shooting is terminated.

In the above operation, the submirror C05 is kept in the retracted position during continuous shooting. This means that the silver halide film C08 can be exposed without waiting for the submirror C05 to be moved. As a result, substantially no time other than that required to feed the film is required between one shot and the next, and thus it is possible to enhance the capability for high-speed shooting. Note however that, since no focus adjustment is performed during continuous shooting, movement of the object may result in ill-focused images.

Figure 9:
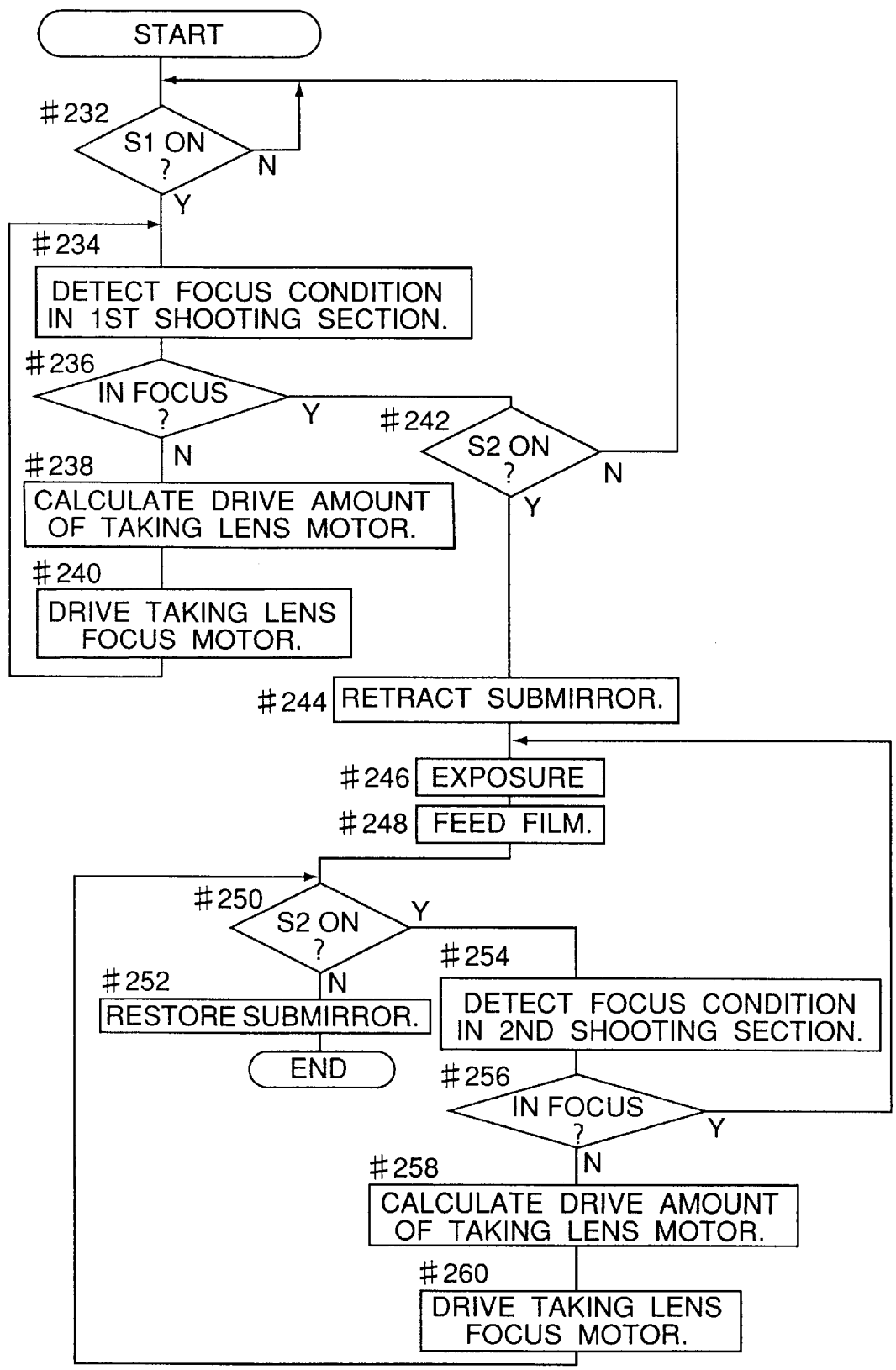
FIG. 9 is a flowchart showing the second procedure for controlling focusing when shooting is performed by means of the silver halide film in continuous shooting mode.

FIG. 9 shows the second procedure performed by the main microcomputer C01 in continuous-shooting mode. The operations in #232 to #242 are the same as those in #192 to #202 in FIG. 8, and therefore the description of these operations will be omitted.

When, in #242, an S2ON signal is issued to request the starting of exposure, the main microcomputer C01 retracts the submirror C05 (#244), opens the shutter C07 to expose the film C08 to light (#246), and, after the completion of exposure, feeds the film one frame forward (#248). During exposure, the flash and light F is fired, if necessary. After the feeding of the film, whether the S2ON signal is present or not is judged (#250). If the S2ON signal is not present, the submirror C05 is retracted (#252), and thus shooting is terminated.

If the S2ON signal is still present, the focus condition of the image in the second shooting section is detected (#254), and the detected defocus amount is compared with a predetermined value to judge whether the taking lens L is in focus or not (#256). If the defocus amount is within the predetermined value, the taking lens L is judged to be in focus, and then the procedure returns to #246 to repeat the exposure and feeding of the film. If the defocus amount is above the predetermined value, the taking lens L is judged to be out of focus. In this case, based on the focal length of the taking lens L at that time and the detected defocus amount, the drive amount of the focus motor L09 of the taking lens L is calculated (#258), and the focus motor L09 is driven accordingly to vary the focal point of the taking lens L (#260). Then, the procedure returns to #250.

In this second procedure, at the outset of continuous shooting, the image in the first shooting section is brought into focus, and thereafter, during continuous shooting, focus-condition detection and focus adjustment are continued. Accordingly, it is possible to obtain well-focused images not only in the first shot but also in the succeeding shots. On the other hand, since focus-condition detection and focus adjustment are performed continuously, the second procedure is not so excellent in high-speed shooting as the first procedure.

During continuous shooting, the focus condition is detected not with respect to the image in the first shooting section, but with respect to that in the second shooting section. In the second shooting section, the focus condition can be detected even when the submirror C05 is in the retracted position. Actually, in the above operation, the focus condition is detected with the submirror C05 kept in the retracted position in order to eliminate the delay in focus-condition detection due to the movement of the submirror C05. Accordingly, even in the second procedure, degradation of the high-speed shooting capability is minimal.

The camera under discussion is so designed that either of the first and second procedures described above can be selected for use in continuous-shooting mode. As described above, the two procedures cope with the movement of the object in different ways. Accordingly, the user can select a procedure that is better suited to particular shooting conditions taking into consideration the movement speed of the object, etc. Although the above description deals only with PH mode, the above first and second procedures for continuous-shooting mode can be used also when shooting is performed by means of the silver halide film in PM mode.

In shooting by means of the first shooting section, the silver halide film can be exposed either instantaneously or for a long period of time, for example, one second or longer. The exposure duration is determined by the camera in A or P exposure-control mode, and is specified by the user through operation of the operation section COP in S or M exposure-control mode. Moreover, in M mode, it is also possible to perform valve shooting, which is a typical example of long-duration-exposure shooting, and in this case, termination of exposure in valve shooting can be commanded by the user through the operation of the operation seton COP.

As described earlier, two types of AF mode are available in PH or PM shooting mode: exposure-inclusive AF mode and exposure-exclusive AF mode. Exposure-inclusive AF mode is provided for the purpose of keeping an image to be shot in focus throughout exposure. In this mode, detection of the focus condition of the image and adjustment of the focus of the taking lens L in accordance with detection results are repeated throughout exposure of the silver halide film. On the other hand, in exposure-exclusive AF mode, the silver halide film is exposed with the focal point of the taking lens L kept in the position specified immediately before exposure. In any of A, S, P, and M exposure-control modes, either type of AF mode can be selected.

In exposure-inclusive AF mode, before the outset of exposure, the focus of the taking lens L is adjusted by detecting the focus condition of the image in the first shooting section, and, after the outset of exposure, the focus of the taking lens L is adjusted by detecting the focus condition in the second shooting section. In order to directly detect the focus condition of the image in the first shooting section, the submirror C05 needs to be placed at the predetermined position in the optical path from the half-mirror C04 to the silver halide film C08. However, if the submirror C05 is moved to that position during exposure, its shadow is formed in the image obtained. To avoid this inconvenience, the image in the second shooting section, not the image in the first shooting section, is used for focus-condition detection after the outset of exposure.

Figure 10:
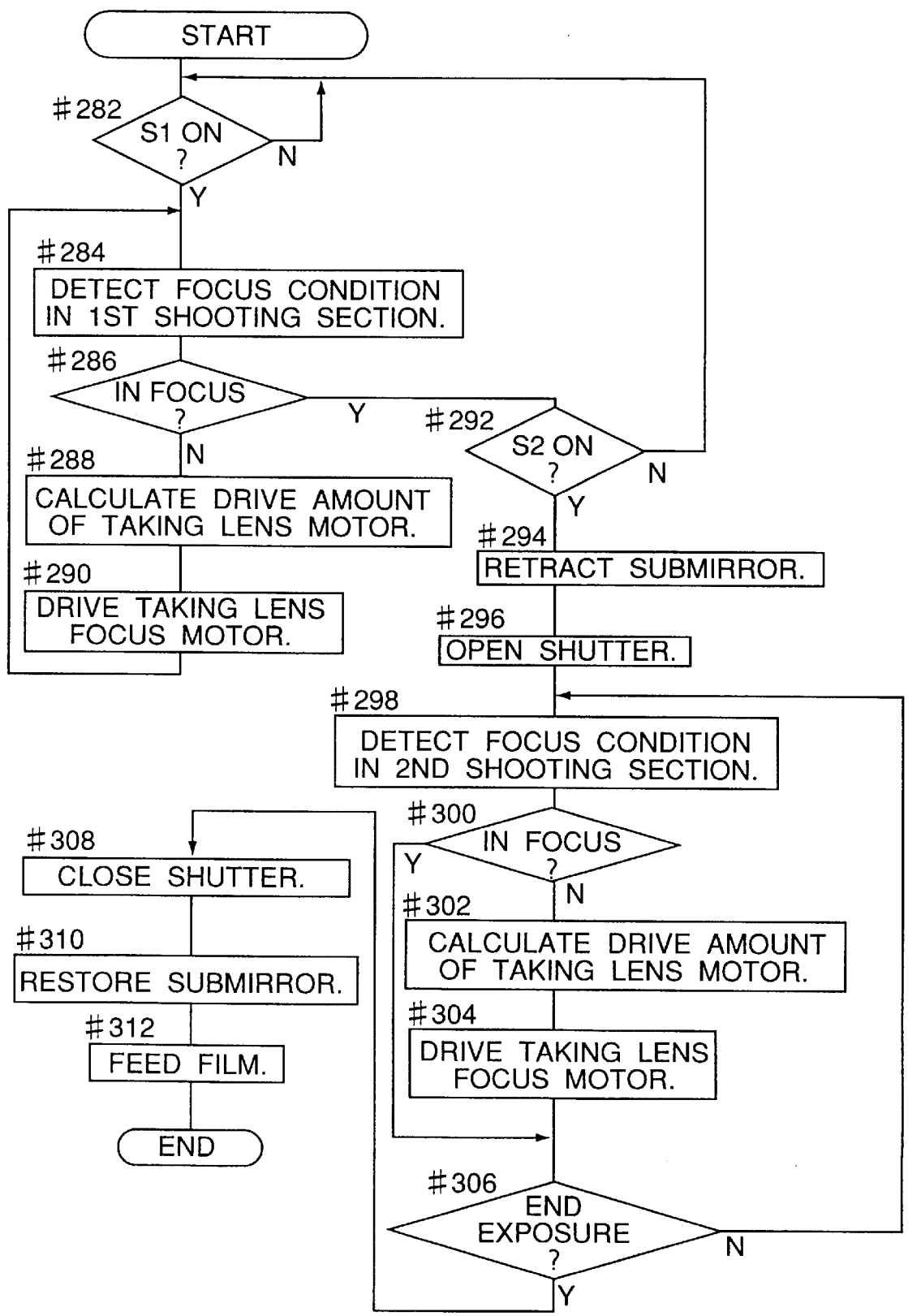
FIG. 10 is a flowchart showing the procedure for controlling focusing when shooting is performed by means of the silver halide film in exposure-inclusive AF mode.

The procedure performed by the main microcomputer C01 in exposure-inclusive AF mode will be described below, with reference to the flowchart in FIG. 10. Here, it is assumed that shooting is performed in PH mode. At the outset of the procedure, the main microcomputer C01 waits for an S1ON signal that is issued to request the starting of focus adjustment when the shutter release button is half-pressed (first stroke) (step #282). When an S1ON signal is issued, the microcomputer C01 detects, by reading the output of the AF module C02, the defocus amount of the image in the first shooting section (#284), and then compares the detected defocus amount with a predetermined value to judge whether the taking lens L is in focus or not (#286).

When the defocus amount is above the predetermined value, the taking lens L is judged to be out of focus. In this case, based on the focal point of the taking lens L at that time and the detected defocus amount, the drive amount of the focus motor L09 of the taking lens L is calculated (#288), and the focus motor L09 is driven accordingly to vary the focal point of the taking lens L (#290). Then, the procedure returns to #284.

If, in #286, the detected defocus amount is within the predetermined limit, the taking lens L is judged to be in focus, and then whether an S2ON signal that is issued when the shutter release button is fully pressed (second stroke) is present or not is judged (#292). If an S2ON signal is not present, the procedure returns to #282. If an S2ON signal is present, shooting is performed by means of the silver halide film. Specifically, the submirror C05 is retracted (#294), and the shutter C07 is opened to start the exposure of the film C08 to light (#296).

During exposure, in order to cope with the variation of the focus condition of the image in the first shooting section, the focus condition of the image in the second shooting section is detected based on the output signal from the A/D converter C22 (#298). Then, by comparing the detected defocus amount with a predetermined value, whether the taking lens L is in focus or not is judged (#300).

If the defocus amount is within the predetermined value, the taking lens L is judged to be in focus, and then the procedure proceeds to #306. If the defocus amount is above the predetermined value, the taking lens L is judged to be out of focus, and the drive amount by which the taking lens L needs to be driven to bring the image in the first shooting section into focus is calculated (#302). This drive amount can be calculated from the detected defocus amount and the focal length and focal point of the taking lens L at that time. Then, the focus motor L09 of the taking lens L is driven accordingly to vary the focal point of the taking lens L (#304).

Next, whether exposure should be terminated or not is judged (#306). When the exposure duration has been determined by the camera in A or P mode, or when the exposure duration has been specified by the user in S or M mode, the timing of terminating exposure is determined based on the time that has elapsed after the opening of the shutter in #296; in valve shooting in M mode, exposure is terminated in response to a signal requesting termination of exposure from the operation section COP. When exposure needs to be continued, the procedure returns to #298 to repeat the operations. When exposure is to be terminated, the shutter C07 is closed (#308), and the submirror C05 is restored (#310). Lastly, the film C08 is fed one frame forward in preparation for a next shot, and then the procedure is terminated.

Exposure-inclusive AF mode is suitable to shoot a moving object with long-duration exposure. Selection between exposure-inclusive AF mode and exposure-exclusive AF mode does not depend on the shutter speed. In the camera under discussion, in A or P exposure-control mode, exposure-inclusive AF mode is selected automatically when exposure longer than one second is required. In S or M mode, exposure-inclusive AF mode is selected by the user when required. The procedure in exposure-exclusive AF mode is just as shown in FIG. 10, except that steps #298 to 304 are omitted. It is also possible, however, to switch between exposure-inclusive AF mode and exposure-exclusive AF mode in accordance with the shutter speed so that, for example, exposure-inclusive AF mode is selected for a shutter speed of one second or longer and exposure-exclusive AF mode is selected for a shutter speed less than one second.

Prior to exposure, the brightness of the object is measured by the AE sensor C03 so that, when the amount of light from the object is judged to be insufficient, the flash and light F is fired during exposure to illuminate the object. The firing of the flash and light F can be executed only once, or more than once, and can be set to take place any time during exposure. In exposure-inclusive AF mode described above, the focus of the taking lens L is so adjusted that the taking lens L is kept in focus for the object all the time. Accordingly, in this mode, by adjusting the light amount of flash illumination, it is possible to shoot the object with appropriate brightness regardless of the movement of the object or the timing of flashing.

When the object is located at a distance closer than the closest possible shooting distance of the taking lens L, it is not possible to obtain a sharp image in the first shooting section. If this happens in MV or PM mode, the main microcomputer C01 sets the focus of the taking lens L to the closest possible distance, and, by adjusting only the focus of the relay optical system C14, performs shooting by means of the second shooting section. In such a case, the releasing of the shutter is inhibited in PM mode.

Since the movable lenses of the relay optical system C14 have a short focal length, their movement within a small range makes adjustment in a wide range possible. In addition, the focal point of the taking lens L is kept in the position corresponding not to infinity but to the shortest possible shooting distance, and therefore the focus of the relay optical system C14 can be adjusted to an object at a very close distance. As a result, the shortest possible shooting distance in video shooting by means of the CCD is very short.

Figure 11:
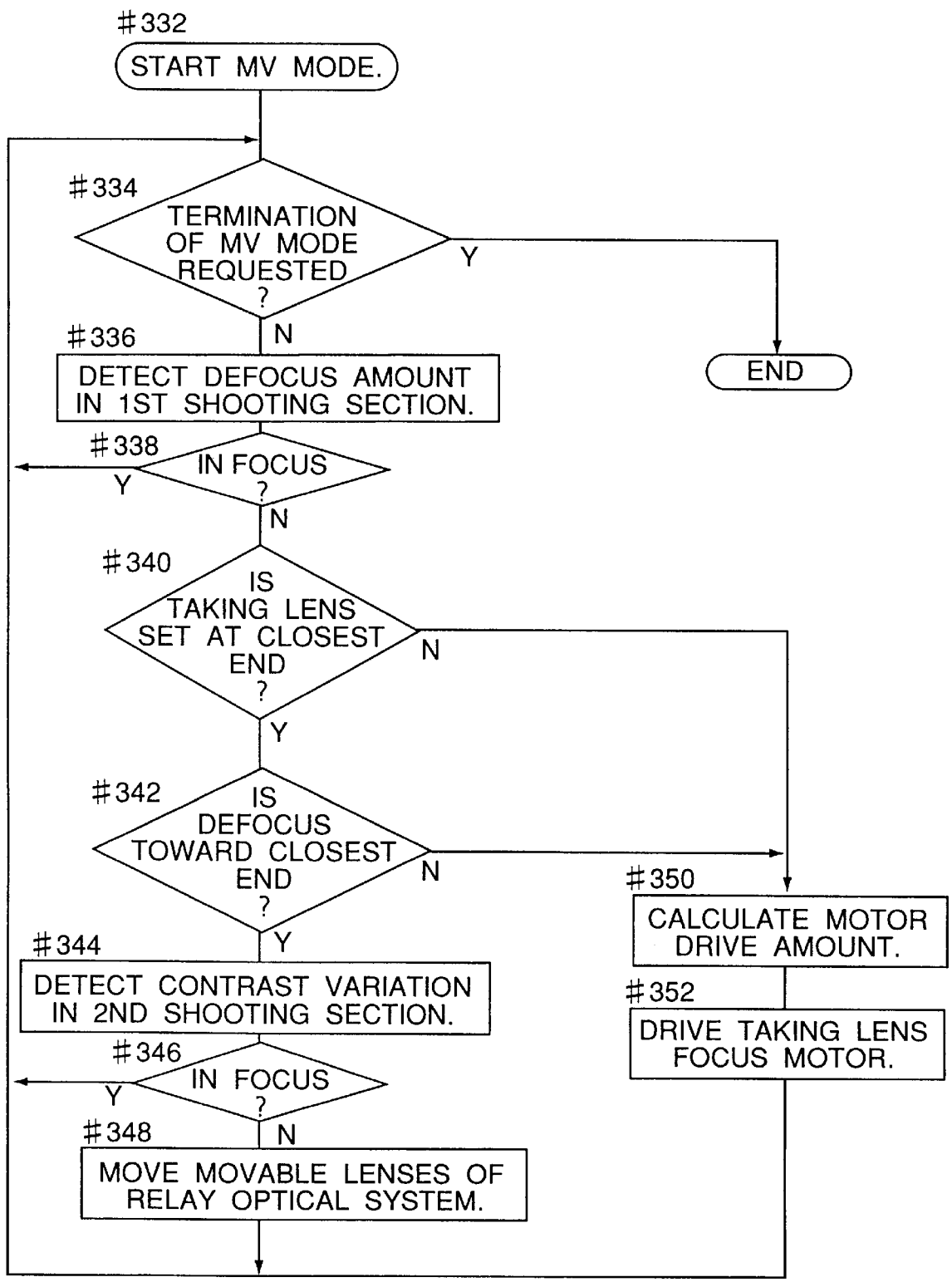
FIG. 11 is a flowchart showing the first procedure for controlling focusing when shooting is performed at a very close object distance in MV mode.

FIG. 11 shows the first control procedure for shortening the closest possible shooting distance in MV mode in which shooting is performed by means of the CCD alone. In this procedure, the focus of the taking lens L and that of the relay optical system C14 are adjusted correlatively so that, when the object is located at a distance closer than the closest possible shooting distance of the taking lens L, focus is adjusted by means of the relay optical system C14, with the focal point of the taking lens L kept in the position corresponding to the closest possible shooting distance.

When MV mode is established through operation of the operation section COP, the main microcomputer C01 instructs the members C22 to C27 to start displaying on the EVF the image captured by the CCD (step #332). Next, whether termination of MV mode is requested from the operation section COP or not is judged (#334). If termination of MV mode is requested, shooting by means of the CCD is terminated, or another mode is established.

If termination of MV mode is not requested, the main microcomputer C01 detects, by reading the output of the AF module C02, the defocus amount of the image in the first shooting section (#336), and judges, by comparing the detected defocus amount with a predetermined value, whether the taking lens L is in focus or not (#338). If the detected defocus amount is within the predetermined value, the taking lens L is judged to be in focus, and the procedure returns to #334 without performing focus adjustment.

If the detected defocus amount is above the predetermined value, whether the taking lens L is set to the focal point corresponding to the closest possible shooting distance or not is judged (#340). If the focal point of the taking lens L is not in the position corresponding to the closest possible shooting distance, then, based on the focal length of the taking lens L at that time and the detected defocus amount, the drive amount of the focus motor L09 of the taking lens L is calculated (#350), and the focus motor L09 is driven accordingly to vary the focal point of the taking lens L (#352). Thereafter, the procedure returns to #334 to repeat the operations.

If, in #340, the focal point of the taking lens L is in the position corresponding to the closest possible shooting distance, it is judged whether the defocus amount indicates the need to move the focal point further for a closer object distance or not, that is, whether the object is located at a distance closer than the closest possible shooting distance or not (#342). If the object is not located at a distance closer than the closest possible shooting distance, the procedure proceeds to #350 to perform focus adjustment by means of the taking lens L.

If the object is located at a distance closer than the closest possible shooting distance, the focal point of the taking lens L is kept in the position corresponding to the closest possible shooting distance, while the movable lenses of the relay optical system C14 are moved slightly for a closer object distance in order to detect, based on the output signal of the A/D converter C22, the variation in contrast of the image in a predetermined area of the image pickup device C21 (#344). The contrast of the image is calculated as the sum total of the differences in brightness between adjacent picture elements. If the contrast of the image does not become higher, the relay optical system C14 is judged to be in focus (#346), and then the procedure returns to #334. If the contrast of the image becomes higher, the movable lenses of the relay optical system C14 are moved continuously to a position where the contrast just starts to decrease (#348). Thereafter, the procedure returns to #334 to repeat the sequence of operations. In MV mode, recording can be started and terminated at any time, independently of the focusing procedure described above. That is, focus adjustment is performed all the time in MV mode.

Figure 12:
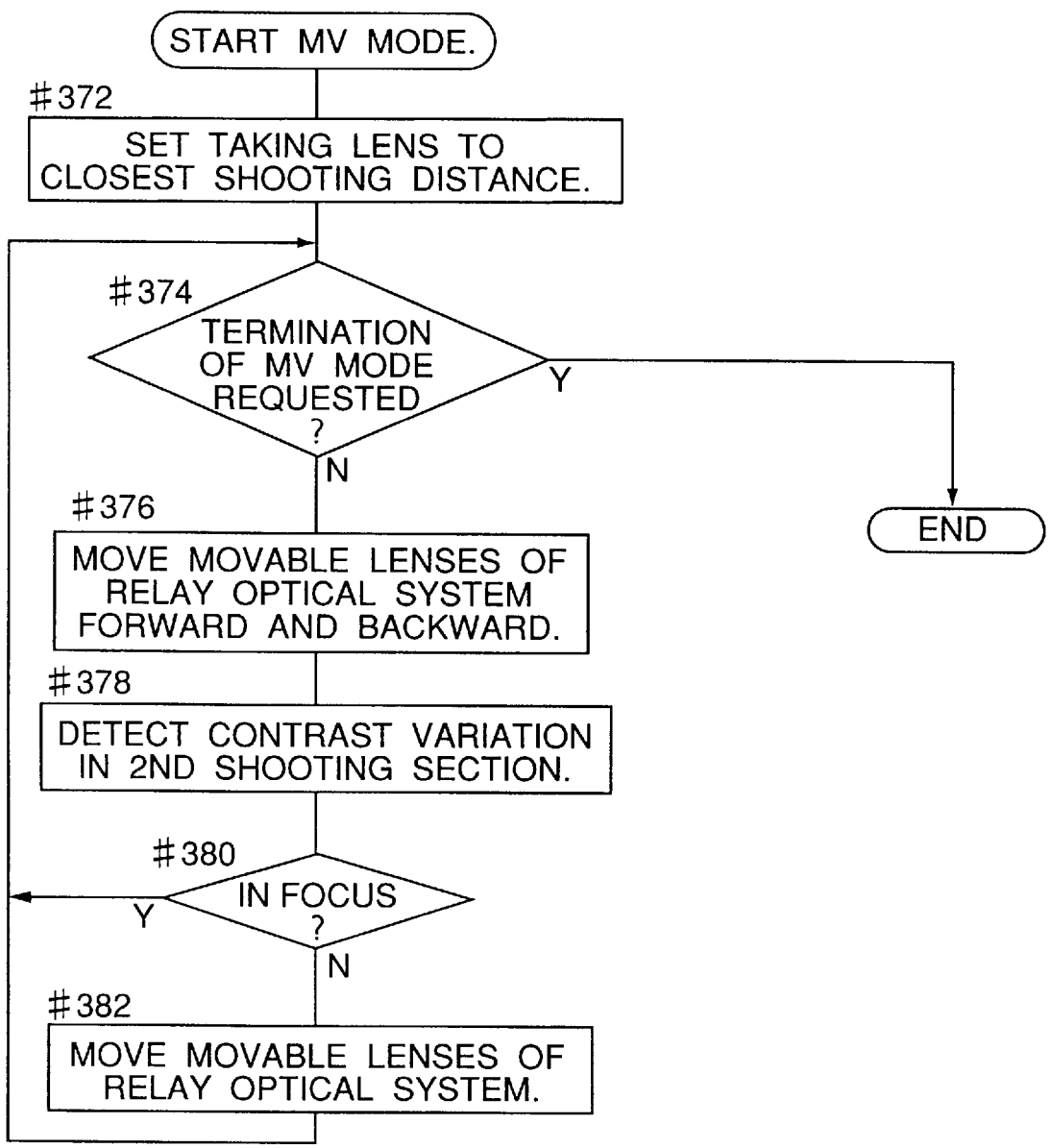
FIG. 12 is a flowchart showing the second procedure for controlling focusing when shooting is performed at a very close object distance in MV mode.

FIG. 12 shows another control procedure performed in MV mode in which shooting is performed by means of the CCD alone. In this procedure, the focal point of the taking lens L is kept in a predetermined position, for example, here, the position corresponding to the closest possible shooting distance, while the focal point of the relay optical system C14 is adjusted.

When MV mode is started through operation of the operation section COP, the main microcomputer C01 sets the focal point of the taking lens L to a position corresponding to the closest distance at which the image of the object can be brought into focus in the first shooting section (step #372). Next, whether termination of MV mode is requested from the operation section COP or not is judged (#374). If termination of MV mode is requested, shooting by means of the CCD is terminated, or another mode is established.

If termination of MV mode is not requested, the main microcomputer C01 moves the movable lenses of the relay optical system C14 slightly forward and backward (#376) in order to detect, based on the output of the A/D converter C22, the variation in contrast of the image in a predetermined area of the image pickup device C21 (#378). If higher contrast is not obtained even when the movable lenses are moved forward or backward, the relay optical system C14 is judged to be in focus (#380), and then the procedure returns to #374.

If the contrast of the image becomes higher, the relay optical system C14 is judged to be out of focus, and the movable lenses of the relay optical system C14 are moved in the direction in which higher contrast has been obtained (#382). While the movable lenses are moved, detection of the contrast variation is continued so that the movable lenses are moved up to a position just before the position where the contrast starts to lower. Thereafter, the procedure returns to #374 to repeat the above operations.

The focal point of the taking lens L does not necessarily have to be fixed at the position corresponding to the closest possible shooting distance, but may be fixed at any position, for example, the position corresponding to infinity. No matter where the focal point of the taking lens L is placed, the relay optical system C14 can form a well-focused image on the CCD with any object located between the closest possible shooting distance of the taking lens L and infinity.

Figure 13:
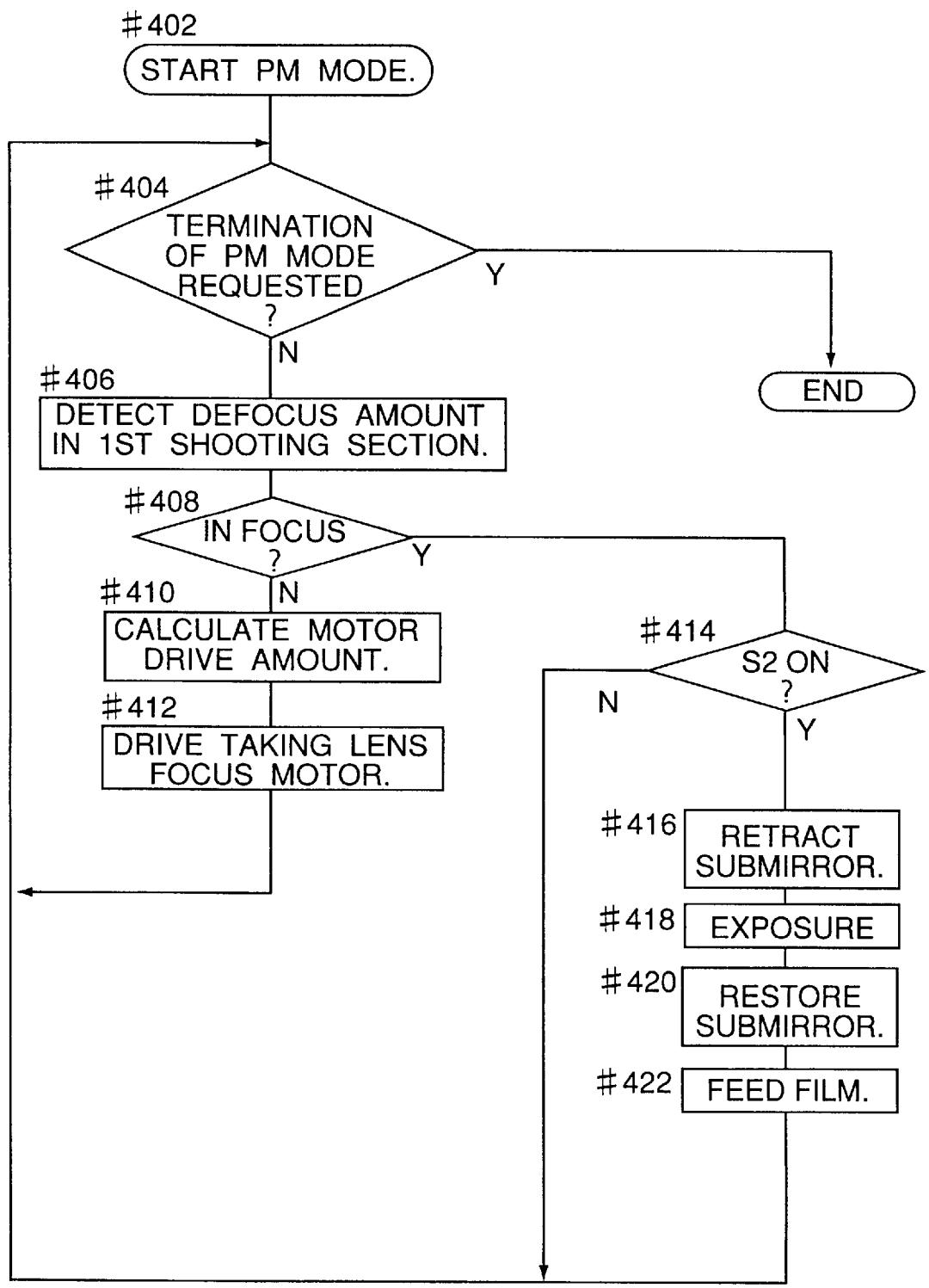
FIG. 13 is a flowchart showing the first procedure for controlling focusing in PM mode, in which shooting is performed by means of both the silver halide film and the CCD.

Next, focus adjustment that is performed in PM mode, in which shooting by means of the silver halide film is performed during shooting by means of the CCD, will be described below. FIG. 13 shows the first control procedure for keeping the image in the first shooting section in focus all the time in PM mode. Naturally, this procedure also keeps the image in the second shooting section in focus all the time, and, to achieve this, the focal point of the relay optical system C14 is set to and kept in a predetermined position.

When PM mode is started through operation of the operation section COP, the main microcomputer C01 instructs the members C22 to C27 to start displaying on the EVF the image captured by CCD (step #402). Next, whether termination of PM mode is requested from the operation section COP or not is judged (#404). If termination of PM mode is requested, the procedure is terminated.

If termination of MV mode is not requested, the main microcomputer C01 detects, based on the output of the AF module C02, the defocus amount of the image in the first shooting section (#406), and judges, by comparing the detected defocus amount with a predetermined value, whether the taking lens L is in focus or not (#408). If the detected defocus amount is above the predetermined value, the taking lens L is judged to be out of focus. In this case, based on the focal length of the taking lens L and the detected defocus amount, the drive amount of the focus motor L09 is calculated (#410), and the focus motor L09 is driven accordingly to vary the focal point of the taking lens (#412). Thereafter, the procedure returns to #404 to repeat the operation.

If, in #408, the detected defocus amount is within the predetermined value, the taking lens L is judged to be in focus, and then whether an S2ON signal that is issued when the shutter release button is fully pressed (second stroke) is present or not (#414). If an S2ON signal is not present, the procedure returns to #404. If an S2ON signal is present, the submirror C05 is retracted (#416), the shutter C07 is opened, and the film C08 is exposed to light (#418). After film exposure, the submirror C05 is restored (#420), and the silver halide film C08 is fed one frame forward in preparation for a next shot (#422). Then, the procedure returns to #404.

Figure 16A:
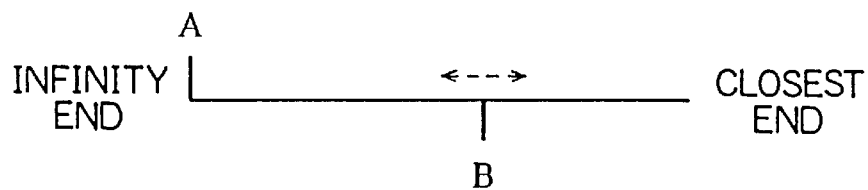
FIGS. 16A to 16D are diagrams explaining the principle of focusing in PM mode.

FIGS. 16A to 16D show the principle of the second procedure, used in PM mode, for bringing the image in the first shooting section into focus only when the silver halide film is exposed to light. In FIGS. 16A to 16D, the letters A and B represent the focal point of the taking lens L and that of the relay optical system C14, respectively. FIG. 16A shows a state seen when the silver halide film is not exposed to light and shooting is performed by means of the CCD alone. When the silver halide film is not exposed to light, the focal point of the taking lens L is kept in a fixed position. The figure shows a case where the focal point of the taking lens L is set to and kept in the infinity position, for example. Focus adjustment with respect to the CCD is performed by detecting the focus condition of the image in the second shooting section and varying the focal point of the relay optical system C14 toward the infinity or closest position, as shown by the arrow in broken lines, in accordance with the detected defocus amount. In this state, the image of the object is not in focus on the silver halide film. In PM mode, recording can be started and terminated at any time, independently of the focusing procedure, as in MV mode.

Figure 16B:
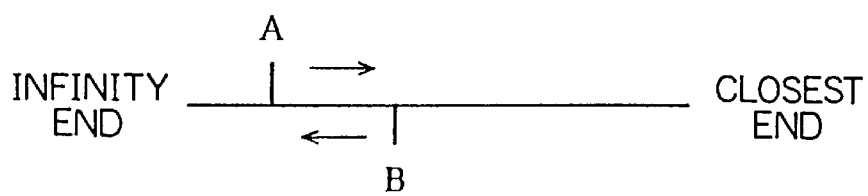
Figure 16C:
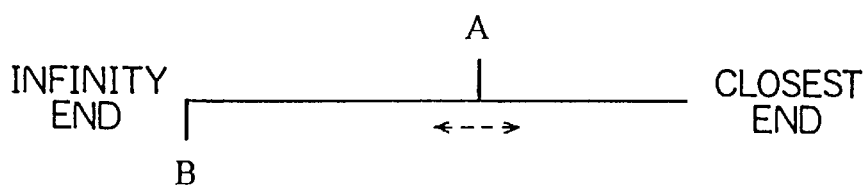

FIG. 16C shows a state seen when the silver halide film is exposed to light. When the silver halide film is exposed to light, the relay optical system C14 is kept in the above-mentioned predetermined position, and the focal point of the taking lens L is adjusted, as shown by the arrow in broken lines, so that the image of the object is brought into focus both on the silver halide film and on the CCD. The figure shows a case where the focal point of the relay optical system C14 is kept in the infinity position, for example.

FIG. 16B shows a transitional state seen when the state changes from one as shown in FIG. 16A where silver halide film is not exposed to light to one as shown in FIG. 16C where silver halide film is exposed to light. Here, the focal point of the taking lens L and that of the relay optical system C14 are varied correlatively, as shown by the arrows in solid lines. In the figure, the image of the object is already in focus with respect to the CCD, and therefore it is now necessary to bring it into focus also with respect to the silver halide film without breaking the already established in-focus state. To achieve this, based on the correlation, stored in the memory C40, between the focal point of the taking lens L and that of the relay optical system C14, the position to which the movable lenses of the relay optical system C14 need to be moved is calculated in accordance with the distance by which the focal point of the taking lens L needs to be moved, and the movable lenses are driven to move accordingly.

Figure 16D:
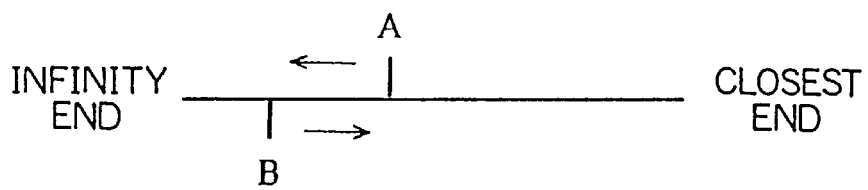

FIG. 16D shows a transitional state seen when the state changes from one as shown in FIG. 16C back to one as shown in FIG. 16A. Here, based on the focal-point correlation stored in the memory C40, the movable lenses of the relay optical system C14 are driven to move just in the same way as in the state shown in FIG. 16B. As the focal point of the taking lens L is varied, the image of the object becomes more and more out of focus with respect to the silver halide film.

In this control method, the image formed on the CCD can be kept in focus all the time, and it is possible, when the silver halide film is not exposed to light, to perform focus adjustment by means of the relay optical system C14 that is small and light, and thus to reduce the electric power consumption. This control method is suitable for single-shot shooting performed in PM mode by means of the silver halide film, or multiple-frame shooting, in which more than one frame is shot at specific time intervals, performed in the same mode by means of the silver halide film.

Note that, after exposure of the silver halide film, the focal point of the taking lens L and that of the relay optical system C14 do not necessarily have to be moved back to positions as shown in FIG. 16A. In other words, focus adjustment may also be performed, with the relay optical system C14 kept in the predetermined position as shown in FIG. 16C, by varying the focal point of the taking lens L, as shown by the arrow in broken lines. This control method is suitable for continuous shooting performed in PM mode by means of the silver halide film.

Figure 14:
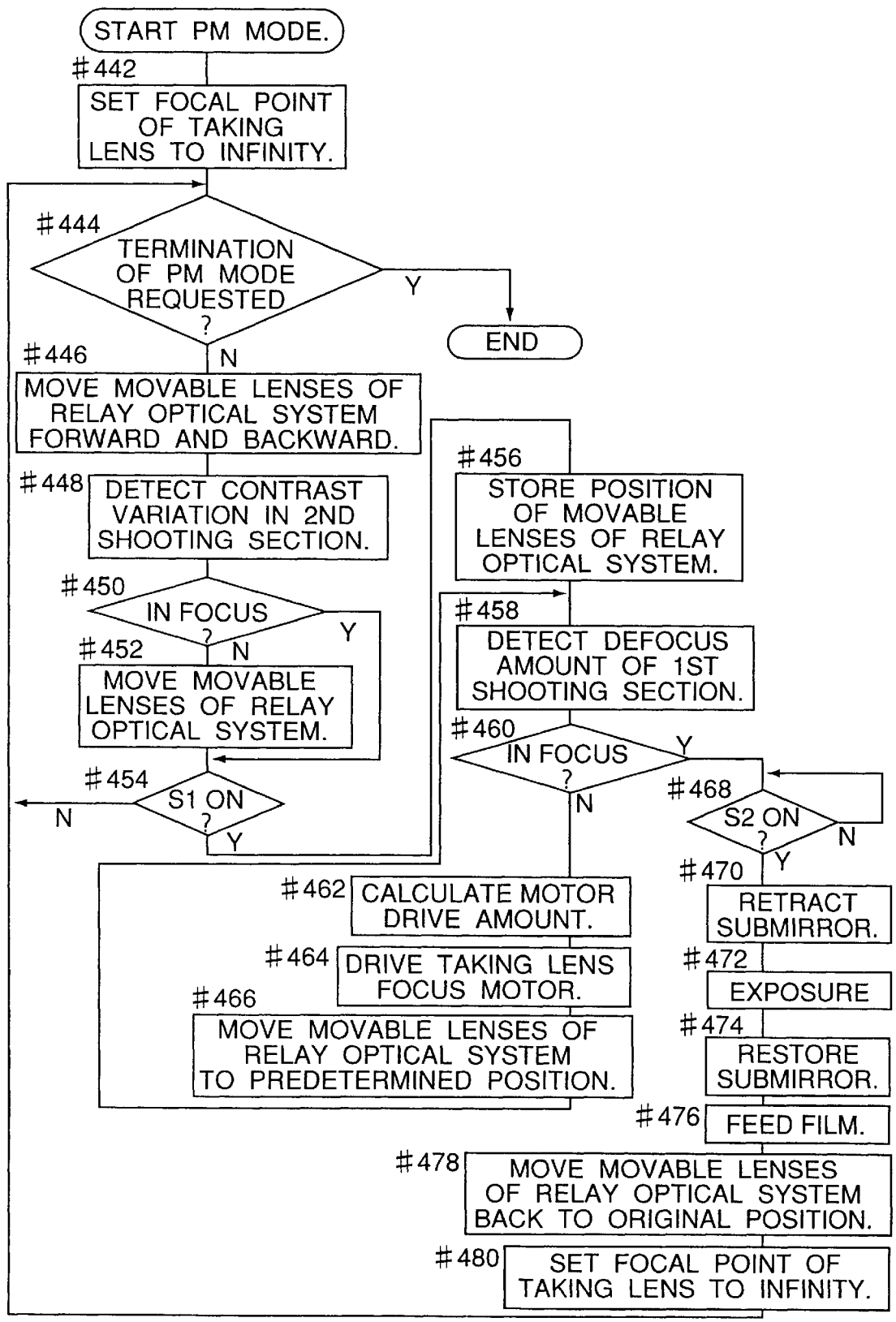
FIG. 14 is a flowchart showing the second procedure for controlling focusing in PM mode.

FIG. 14 shows the second example of the control procedure in PM mode. In this procedure, every time a frame is shot on the silver halide film, the state changes from one as shown in FIG. 16C to one as shown in FIG. 16A, as described above. The main microcomputer C01 first sets the focal point of the taking lens L to the position corresponding to infinity (step #442). Then, whether termination of PM mode is requested from the operation section COP or not is judged (#444). If termination of PM mode is requested, shooting is terminated.

If termination of PM mode is not requested, the main microcomputer C01 moves the movable lenses of the relay optical system C14 slightly forward and backward (#446) in order to detect, based on the output of the A/D converter C22, the variation in contrast of the image in a predetermined area of the image pickup device C21 (#448). If the contrast becomes higher, the relay optical system C14 is judged to be out of focus (#450), and the movable lenses of the relay optical system C14 are moved in the direction in which higher contrast has been obtained #452). While the movable lenses are moved, detection of the contrast variation is continued so that the movable lenses are moved up to a position just before the position where the contrast starts to lower. If, in #450, higher contrast is not obtained even when the movable lenses are moved forward or backward, the relay optical system C14 is judged to be in focus, and the operation in step #452 is omitted.

Next, whether an S1ON signal that is issued when the shutter release button is operated is present or not is judged (#454). If an S1ON signal is not present, the procedure returns to #444. If an S1ON signal that requests focus adjustment with respect to the silver halide film is present, the position of the movable lenses of the relay optical system C14 at that time is stored (#456). Then, based on the output from the AF module C02, the defocus amount of the image in the first shooting section is detected (#458), and the detected defocus amount is compared with a predetermined value to judge whether the taking lens L is in focus or not (#460).

If the detected defocus amount is above the predetermined value, the taking lens L is judged to be out of focus. In this case, based on the focal length of the taking lens L and the defocus amount, the drive amount of the focus motor L09 is calculated (#462). Then, the focus motor L09 is driven accordingly to vary the focal point of the taking lens L (#464), and at the same time the movable lenses of the relay optical system C14 are moved so that the focal point of the relay optical system C14 is moved to a predetermined position (#466). Meanwhile, as described above, the position of the movable lenses is calculated constantly based on the correlation, stored in the memory C40, between the focal point of the taking lens L and that of the relay optical system C14 so that the image in the second shooting section is kept in focus all the time while the movable lenses are moved. Thereafter, the procedure returns to #458 to detect the defocus amount.

If, in #460, the detected defocus amount is within the predetermined value, the taking lens L is judged to be in focus, and then the procedure waits for an S2ON signal requesting exposure of the silver halide film (#468). When an S2ON signal is issued, the submirror C05 is retracted (#470), and the shutter C07 is opened to expose the film C08 to light (#472). After film exposure, the submirror C05 is restored (#474), and the silver halide film C08 is fed one frame forward (#476) in preparation for a next shot. Furthermore, the movable lenses of the relay optical system C14 are moved back to the position stored in #456 (#478), and the focal point of the taking lens L is set back to infinity (#480). Here also, the image in the second shooting section is kept in focus based on the focal-point correlation, stored in the memory C40, between the taking lens L and the relay optical system C14. Thereafter, the procedure returns to #444 to repeat the operations, and thus shooting by means of the CCD is continued.

In the above procedure, it is also possible, when an S2ON signal is not present in #468, to return to #458, instead of waiting for issuance of an S2ON signal. Even in case the object moves during the period after the issuance of an S1ON signal until the issuance of an S2ON signal, a well-focused image can be obtained.

Figure 15:
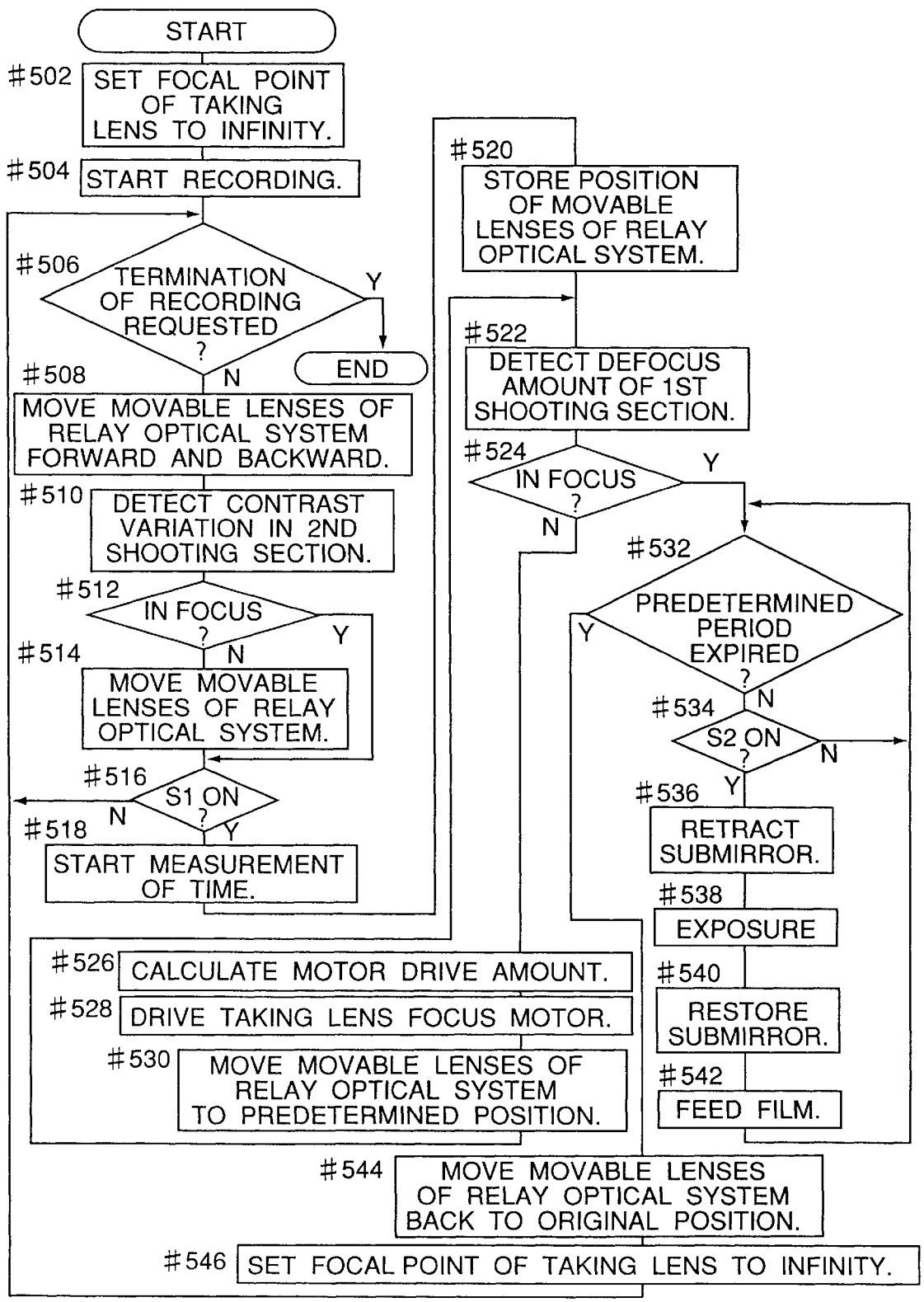
FIG. 15 is a flowchart showing the third procedure for controlling focusing in PM mode.

FIG. 15 shows a third example of the control procedure used in PM mode. In this procedure, a state as shown in FIG. 16C is retained for a predetermined time period after the outset of shooting by means of the silver halide film, and thereafter a state as shown in FIG. 16A is restored. Before the expiration of the predetermined time period, continuous shooting by means of the silver halide film can be performed. Here, the operations in steps #502 to #516 are the same as those in #442 to #454 in FIG. 14, and therefore the description of these operations will be omitted.

When an S1ON signal requesting focus adjustment with respect to the silver halide film is issued (#516), the main microcomputer C01 activates a built-in timer in order to manage the above-mentioned predetermined time period (#518). Then, the position of the movable lenses of the relay optical system C14 at that time is stored (#520), the defocus amount of the image in the first shooting section is detected (#522), and whether the taking lens L is in focus or not is judged (#524). If the taking lens L is judged to be out of focus, the drive amount of the focus motor of the taking lens L is calculated (#526) to vary the focal point of the taking lens L accordingly (#528), and sets the focal point of the relay optical system C14 to the predetermined position (#530). Then, the procedure returns to #522. All this while, the movable lenses of the relay optical system C14 are moved in such a way that the image in the second shooting section is kept in focus.

If, in #524, the taking lens L is judged to be in focus, the timer activated in #518 judges whether the predetermined time period starting on the detection of the S1ON signal has expired or not (#532). If the predetermined time period has not expired, then, in response to an S2ON signal requesting exposure of the silver halide film (#534), the submirror is retracted (#536), the shutter is opened to expose the film to light (#538), the submirror is restored (#540), and the film is fed one frame forward (#542). Thereafter, the procedure returns to #532 to judge again whether the predetermined time period has expired or not.

If, in #532, the predetermined time period has expired, the movable lenses of the relay optical system C14 are moved back to the position stored in #520 (#544), and the focal point of the taking lens L is set back to infinity (#546). Here also, the image in the second shooting section is kept in focus by moving the movable lenses of the relay optical system C14 based on the focal-point correlation stored in the memory C40. Thereafter, the procedure returns to #506 to repeat the operations, and thus shooting by means of the CCD is continued.

The operations in steps #534 to #542 are repeated until the predetermined time period expires, and meanwhile continuous shooting by means of the silver halide film is performed. In the above procedure, it is also possible, when an S2ON signal is not present in #534 or after the feeding of the film in #542, to return to #522, instead of returning to #532. Even in case the subject moves during the period after the issuance of the S1ON signal until the termination of continuous shooting, the taking lens L can be kept in focus, and thus the image of the object can be kept in focus in all of the frames shot during continuous shooting.

Shooting still pictures by means of the silver halide film requires a high-speed shooting capability in order not to miss shutter chances. Accordingly, once the camera goes out of focus, focusing needs to be performed speedily. On the other hand, shooting moving pictures by means of the CCD does not require a high-speed shooting capability, and excessively fast focusing rather damages obtained images with abrupt changes between out-of-focus and in-focus states. Moreover, in moving-picture shooting, a special effect called "focusing in" may be used in which an at first out-of-focus image of the object is gradually brought into focus. Therefore, in CCD shooting, focusing needs to be performed slowly.

The control procedure used in AF mode for driving the focus motor L09 in two different speeds in accordance with the shooting mode will be described below. The focus motor L09 is driven at a relatively high speed (first speed) in PH mode, in which shooting is performed by means of the silver halide film alone, and at a relatively slow speed (second speed) in MV mode, in which shooting is performed by means of the CCD alone. In PM mode, in which shooting is performed by means of both the silver halide film and the CCD, the focus motor L09 is driven at the first speed during a period after the issuance of an S2ON signal until the termination of silver halide film shooting, and, otherwise, at the second speed.

Figure 20:
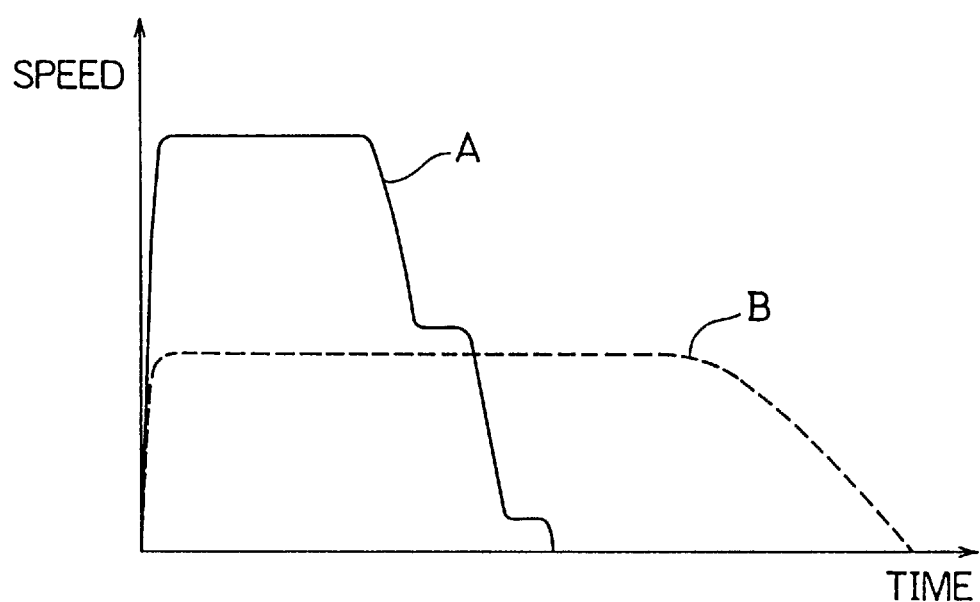
FIG. 20 is a diagram showing how focusing is performed at two different speeds.

FIG. 20 shows an example of focusing speed control. The curve A represents the first speed used in PH and PM mode, and the curve B represents the second speed used in MV and PM mode. Here, the maximum value of the second speed is set to approximately half the maximum value of the first speed, and accordingly the same amount of focusing (represented by the equal areas under the curves A and B) can be achieved twice as quickly at the first speed as at the second speed. The second speed may be set to a still slower speed. Note that the focus motor L09 is brought to a rest gradually when the slower, second speed is used, and stepwise when the faster, first speed is used.

The control procedures for the above-mentioned focusing will be described below, with reference to the flowcharts in FIGS. 17 to 19. Here, the use of the two permissible limits DF1 and DF2 of defocus defined earlier by formulae (1) and (2) in judging the focus condition will also be described specifically.

Figure 17:
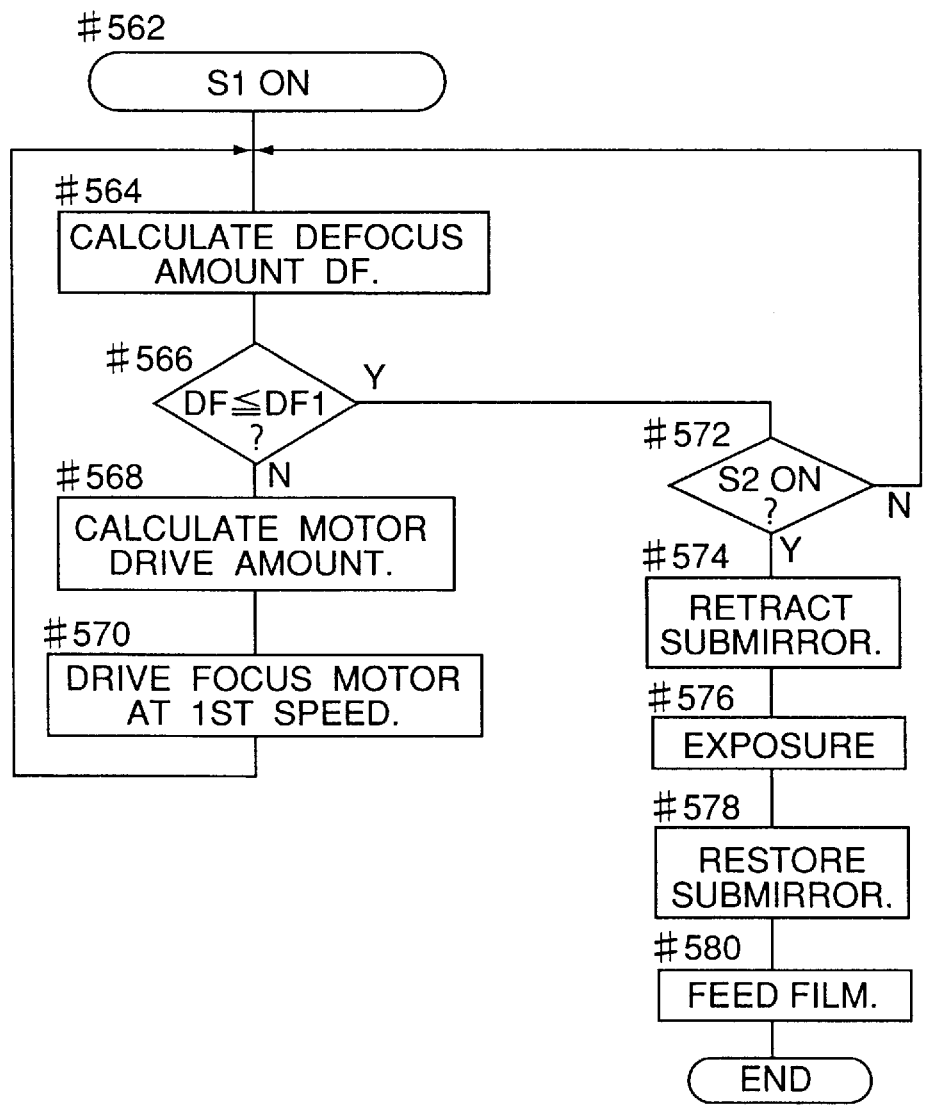
FIG. 17 is a flowchart showing a first example of the procedure for performing focusing at different speeds.

FIG. 17 shows the control procedure used in PH mode, in which shooting is performed by the first shooting section alone. When, in PH mode, the shutter release button is pressed and an S1ON signal is issued (step #562), the main microcomputer C01 calculates the defocus amount DF based on the output of the AF module C02 (#564). The defocus amount DF is compared with the first permissible limit DF1 defined by formula (1) (#566) to judge whether the taking lens L is in focus or not. If the taking lens L is judged to be out of focus, based on the defocus amount DF and the focal length, the drive amount of the focus motor C09 is calculated (#568) to drive the focus motor C09 accordingly (#570). Here, the focus motor C09 is driven at the higher, first speed.

If, in #566, the taking lens L is judged to be in focus, then whether the shutter release button is pressed fully or not, that is, whether an S2ON signal is present or not is judged (#572). If an S2ON signal is not present, the procedure returns to #564 to repeat the above operations. If an S2ON signal is present, the submirror C05 is retracted (#574), and the shutter C07 is opened to expose the silver halide film C08 to light (#576). On completion of exposure, the submirror C05 is restored (#578), and the film is fed one frame forward (#580) in preparation for a next shot.

Figure 18:
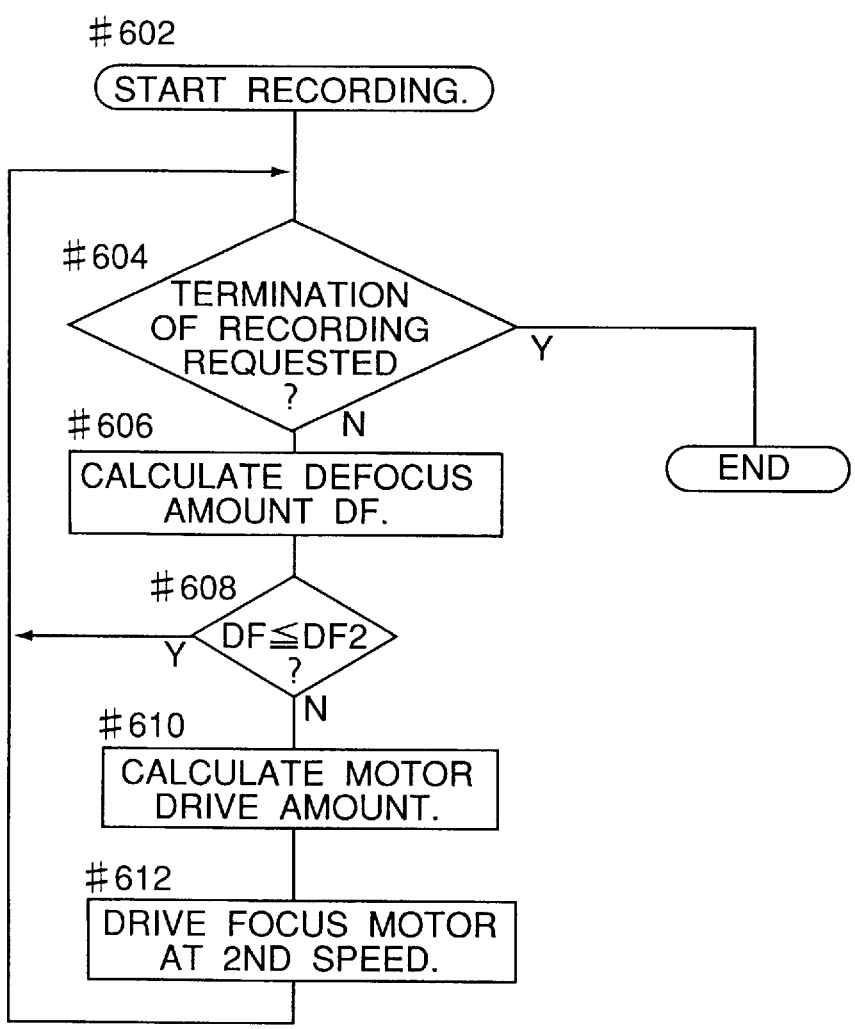
FIG. 18 is a flowchart showing a second example of the procedure for performing focusing at different speeds.

FIG. 18 shows the control procedure used in MV mode, in which shooting is performed by the second shooting section alone. As described earlier, in the second shooting section, the light reflected from the half-mirror C04 is constantly monitored regardless of the shooting mode. When MV mode is started and starting of recording is requested through operation of the operation section COP, the main microcomputer C01 instructs the recording/reproducing section C25 to start recording image and sound signals onto the magnetic tape C28 (step #602). Next, whether termination of recording is requested from the operation section COP or not is judged (#604), and, if termination of recording is requested, shooting by the second shooting section is terminated.

If termination of recording is not requested, the defocus amount DF is calculated based on the output of the AF module C02 (#606), and the defocus amount DF is compared with the second permissible limit DF2 defined by formula (2) (#608) to judge whether the taking lens L is in focus or not. If the taking lens L is in focus, the procedure returns to #604 to repeat the operations. If the taking lens L is out of focus, based on the defocus amount DF and the focal length, the drive amount of the focus motor C09 is calculated (#610), and the focus motor C09 is driven accordingly (#612). Here, the focus motor C09 is driven at the slower, second speed. Thereafter, the procedure returns to #604 to repeat the above operations. In this procedure, it is also possible to perform focusing (#606 to #612) all the time, independently of the starting (#602) and termination (#604) of recording.

Figure 19:
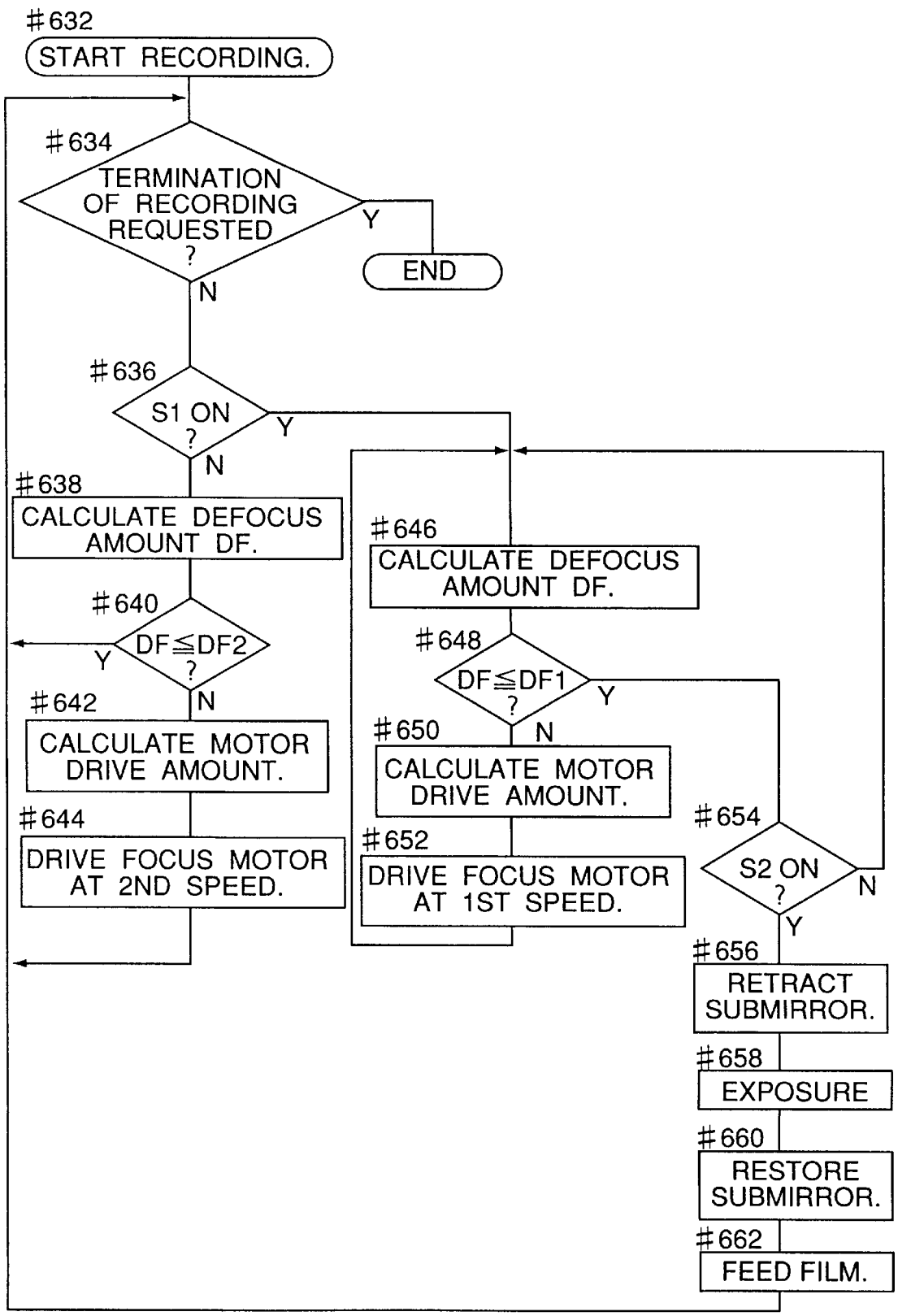
FIG. 19 is a flowchart showing a third example of the procedure for performing focusing at different speeds.

FIG. 19 shows the control procedure used in PM mode, in which shooting is performed by both the first and second shooting sections. When starting of recording is requested through operation of the operation section COP, the main microcomputer C01 instructs the recording/reproducing section C25 to start recording image and sound signals onto the magnetic tape C28 (step #632). Next, whether termination of recording is requested from the operation section COP or not is judged (#634), and, if termination of recording is requested, shooting by the second shooting section is terminated. If termination of recording is not requested, then whether the shutter release button is pressed or not, that is, whether an S1ON signal is present or not is judged (#636).

If an S1ON signal is not present, then, based on the output of the AF module C02, the defocus amount DF is calculated (#638), and the defocus amount DF is compared with the second permissible limit DF2 (#640) to judge whether the taking lens L is in focus or not. If the taking lens L is in focus, the procedure returns to #634. If the taking lens L is out of focus, the drive amount of the focus motor C09 is calculated (#642) and the focus motor C09 is driven accordingly at the slower, second speed (#644). Then, the procedure returns to #634.

If, in #636, an S1ON signal that requests shooting by means of the silver halide film is present, then the defocus amount DF is calculated based on the output of the AF module C02 (#646), and the defocus amount DF is compared with the first permissible limit DF1 (#648) to judge whether the taking lens L is in focus or not. If the taking lens L is judged to be out of focus, the drive amount of the focus motor C09 is calculated (#650) and the focus motor C09 is driven accordingly at the higher, first speed (#652). Thereafter, the procedure returns to #646 to repeat calculation of the defocus amount and detection of the focus condition.

If, in #648, the taking lens L is judged to be in focus, then whether an S2ON signal is present or not is judged (#654). If an S2ON signal is present, the submirror C05 is retracted (#656), the silver halide film C08 is exposed to light (#658), the submirror is restored (#660), and the film is fed one frame forward (#662). Then, the procedure returns to #634. The operations in steps #656 to #662 are operations performed by the first shooting section to achieve silver halide film shooting, but, even while these steps are performed, the second shooting section continues recording the images captured by the CCD onto the magnetic tape C28. In this procedure, just as in the procedure shown in FIG. 18, it is also possible to perform focusing within the second permissible limit all the time.

By detecting focus condition and controlling focus adjustment in the way as described above, silver halide film shooting of still pictures can be performed speedily, and, in addition, it is possible to obtain well-focused images. In CCD shooting, on the other hand, since an out-of-focus image of the object is slowly brought into focus, it is possible to obtain natural moving pictures free from abrupt change of focus.

In general, a motor consumes more electric power at a high speed than at a low speed. In the above described procedure for controlling focus adjustment, the focus motor C09 is driven at a low speed during moving-picture shooting, which tends to be performed for a relatively long time. As a result, it is possible to reduce consumption of the electric power supplied from the power supply C29.

Obviously, many modifications and variations of the present invention are possible in light of the above teachings. It is therefore to be understood that within the scope of the appended claims, the invention may be practiced other than as specifically described.

What is claimed is:

1. A camera that receives a light beam from an object through a main optical system to shoot an image formed by the light beam, comprising:
    a first shooting device for shooting an image formed by a light beam having passed through said main optical system;
    a second shooting device, provided separately from said first shooting device, for shooting an image formed by a light beam having passed through said main optical system;
    a first detector for detecting a focus condition of an image in said first shooting device; and
    a second detector, provided separately from said first detector, for detecting a focus condition of an image in said second shooting device.

2. A camera as claimed in claim 1, wherein a light beam splitting element for splitting a light beam having passed through said main optical system into two light beams is provided, and two split light beams are respectively directed to said first and second detectors.

3. A camera as claimed in claim 1, wherein said first and second detectors use different detection methods.

4. A camera as claimed in claim 3, wherein said detection methods are a phase-difference detection method and a contrast detection method.

5. A camera as claimed in claim 1, wherein said first shooting device shoots a still picture and said second shooting device shoots a moving picture.

6. A camera as claimed in claim 1, wherein, when a focus condition of an image in said first shooting device cannot be detected by said first detector, the focus condition of the image in said first shooting device is detected based on a result of detection by said second detector.

7. A shooting apparatus that that splits light from a shooting object into a first light beam and a second light beam so that the first light beam is used to achieve a first type of shooting and the second light beam is used to achieve a second type of shooting, comprising:
    a first detector for receiving said first light beam to detect a focus condition of an image formed by the first light beam;
    a second detector for receiving said second light beam to detect a focus condition of an image formed by the second light beam; and
    a controller for controlling operation of said first and second detectors in accordance with operation states of said first and second types of shooting.

8. The shooting apparatus as claimed in claim 7, wherein said first and second detectors detect a focus condition of an image in said first and second shooting devices, respectively.

9. The shooting apparatus as claimed in claim 8, wherein said first and second detectors use different detection methods.

10. The shooting apparatus as claimed in claim 7, wherein said first and second detectors use different detection methods.

11. The shooting apparatus as claimed in claim 10, wherein, when a focus condition of an image cannot be detected by one of said first and second detectors, the focus condition of that image is detected based on a result of detection by the other detector.

12. The shooting apparatus as claimed in claim 10, wherein said detection methods are a phase difference detection method and a contrast detection method.

13. The shooting apparatus as claimed in claim 10, wherein said second detector performs detection in consideration of a result of detection by said first detector.

14. The shooting apparatus as claimed in claim 7, wherein said first detector detects a focus condition of an image formed by a light beam from a predetermined area within the target area, and
    said second detector detects a focus condition of an image formed by a light beam from an area wider than said predetermined area within the target area.

15. The shooting apparatus as claimed in claim 7, wherein, when detection by the first detector is impossible in the first type of shooting, the second detector is activated.

16. The shooting apparatus as claimed in claim 7, wherein the first type of shooting is achieved by use of silver-halide film and the second type of shooting is achieved by recording images as electronic pictures.

17. The shooting apparatus as claimed in claim 16, wherein, in the second type of shooting, a light-receiving element for shooting is used also as a light-receiving element for focus detection.

18. The shooting apparatus as claimed in claim 16, wherein when detection by the first detector is impossible in the first type of shooting, the second detector is activated.

19. The shooting apparatus as claimed in claim 7, wherein, when the first and second types of shooting are performed, the first and second detectors are activated.

20. The shooting apparatus as claimed in claim 7, wherein the second light beam is directed to the second detector through a relay optical system.

21. The shooting apparatus as claimed in claim 20, wherein, when only the second type of shooting is performed, only the second detector is activated.

22. A shooting apparatus comprising:
    first shooting means for shooting an image formed by light from a shooting object, said first shooting means including first detecting means for detecting a focus condition of the thus formed image;
    second shooting means for shooting an image formed by the light from the shooting object, said second shooting means including second detecting means for detecting a focus condition of the thus formed image; and
    controlling means for controlling the first and second detection means in accordance with operation states of the first and second shooting means.

* * * * *

UNITED STATES PATENT AND TRADEMARK OFFICE
CERTIFICATE OF CORRECTION

PATENT NO. : 5,815,748
DATED : September 29, 1998
INVENTOR(S) : HAMAMURA et al.

It is certified that error appears in the above-identified patent and that said Letters Patent is hereby corrected as shown below:

Col. 35, 1. 50: Delete "that" (second occurrence)

Signed and Sealed this

Twenty-third Day of February, 1999

Attest:

Q. TODD DICKINSON

*Attesting Officer*    *Acting Commissioner of Patents and Trademarks*